United States Patent [19]
Bush et al.

[11] Patent Number: 5,903,350
[45] Date of Patent: May 11, 1999

[54] DEMODULATOR AND METHOD USEFUL FOR MULTIPLEXED OPTICAL SENSORS

[75] Inventors: Ira Jeffery Bush, Los Angeles; Allen Curtis Cekorich, Walnut Creek, both of Calif.

[73] Assignee: Optiphase, Inc., Van Nuys, Calif.

[21] Appl. No.: 09/099,553

[22] Filed: Jun. 18, 1998

Related U.S. Application Data

[63] Continuation of application No. 08/792,402, Feb. 3, 1997, abandoned.

[51] Int. Cl.[6] .................................................. G01B 9/02
[52] U.S. Cl. ......................... 356/345; 356/350; 329/346
[58] Field of Search ................................. 356/350, 345; 250/227.19, 227.27; 385/12, 14; 329/346

[56] References Cited

U.S. PATENT DOCUMENTS 5,351,123  9/1994  Spahlinger .............................. 356/350

*Primary Examiner*—Samuel A. Turner
*Attorney, Agent, or Firm*—George W. Finch

[57] ABSTRACT

An apparatus and method is presented to provide wide dynamic range measurements of the input phase to an interferometer using a phase generated carrier especially useful utilizing time multiplexing to demodulate a series of interferometers. A modulation drive output is provided by the invention and maintained under operation at the optimum amplitude by an internal feedback loop. The resulting highly stable system can be fabricated from an analog to digital converter, a digital signal processor, and a digital to analog converter making low cost open loop demodulators a reality.

25 Claims, 17 Drawing Sheets

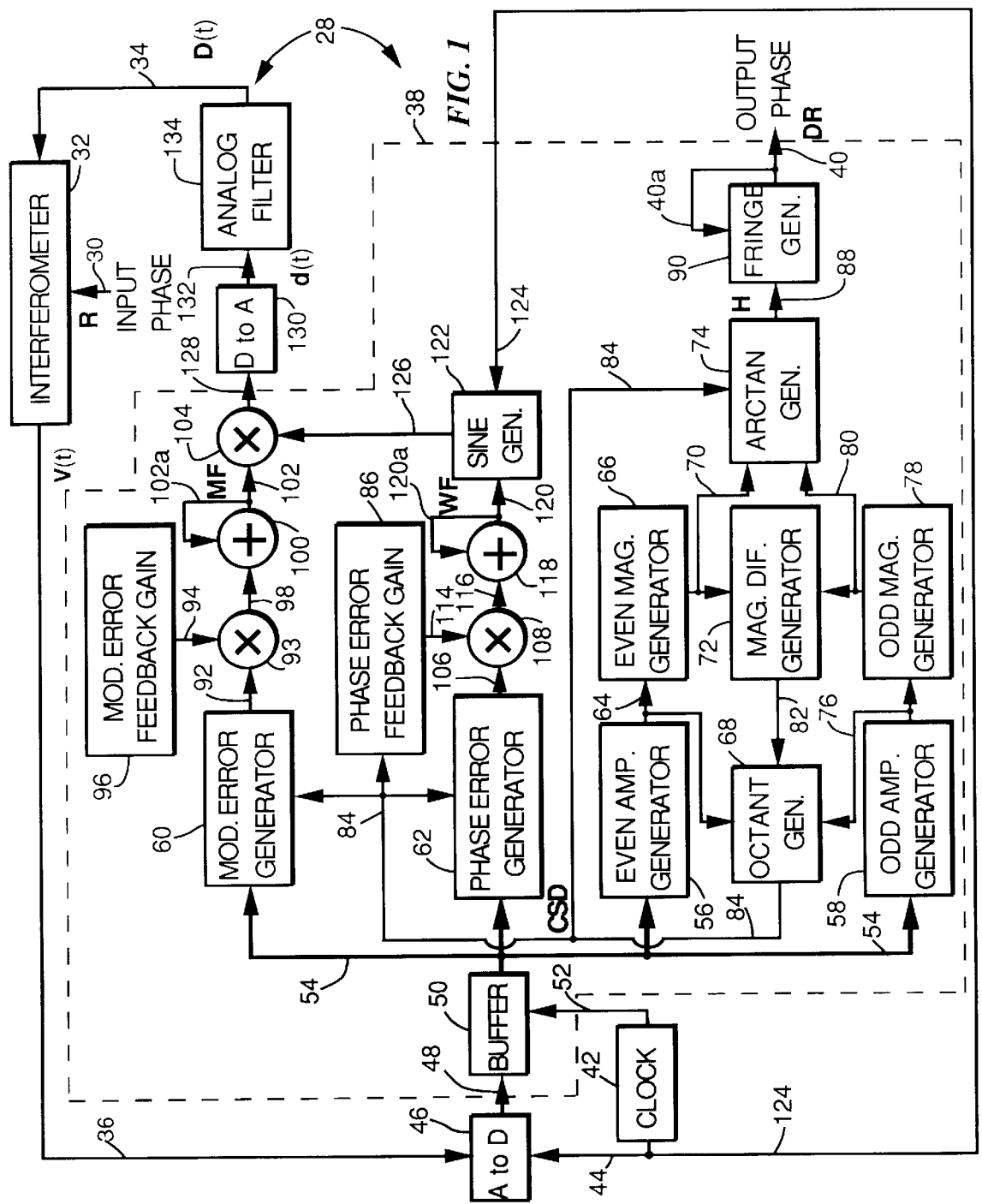

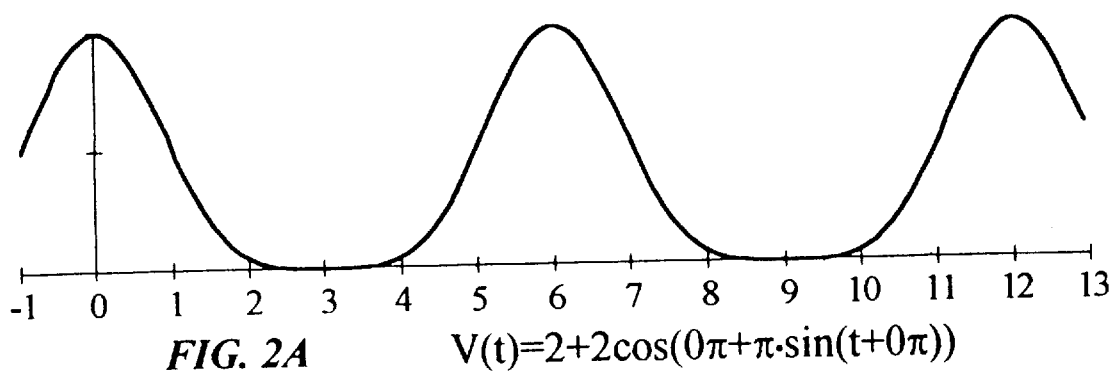
FIG. 2A  $V(t)=2+2\cos(0\pi+\pi\cdot\sin(t+0\pi))$
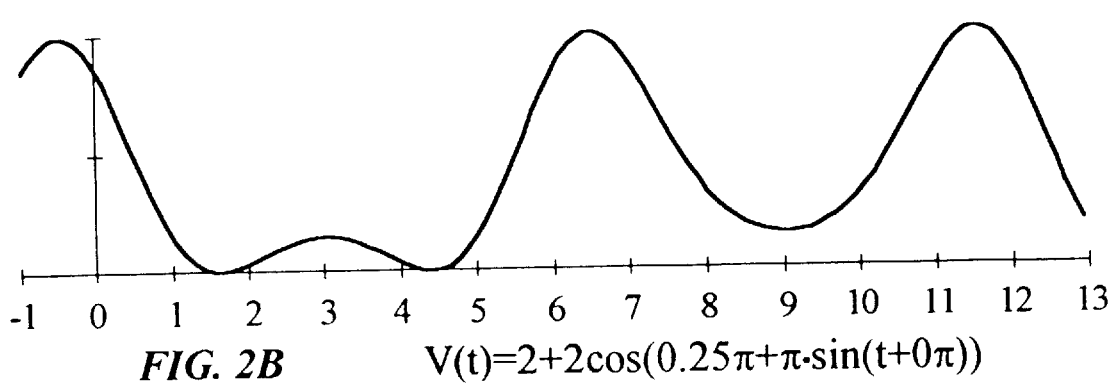
FIG. 2B  $V(t)=2+2\cos(0.25\pi+\pi\cdot\sin(t+0\pi))$
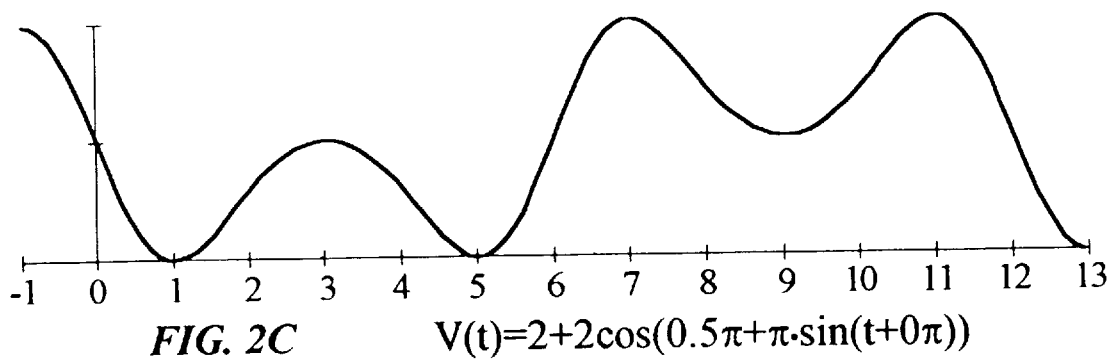
FIG. 2C  $V(t)=2+2\cos(0.5\pi+\pi\cdot\sin(t+0\pi))$
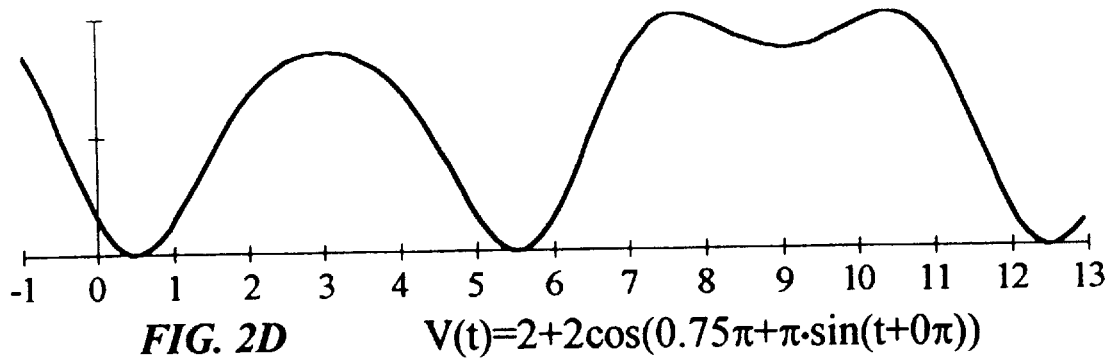
FIG. 2D  $V(t)=2+2\cos(0.75\pi+\pi\cdot\sin(t+0\pi))$

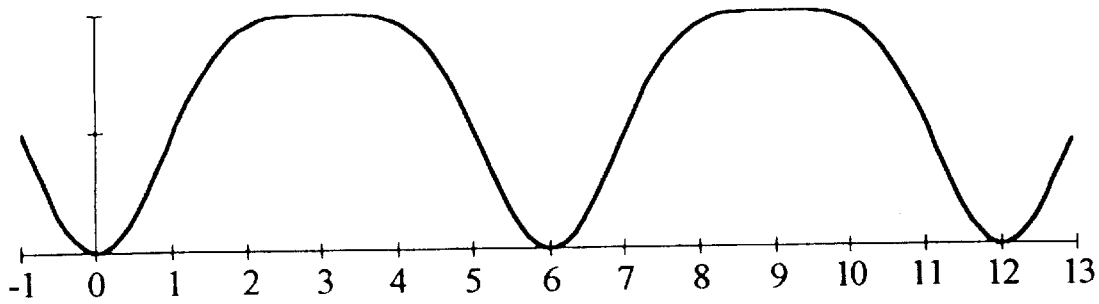
FIG. 2E  $V(t)=2+2\cos(1\pi+\pi\cdot\sin(t+0\pi))$
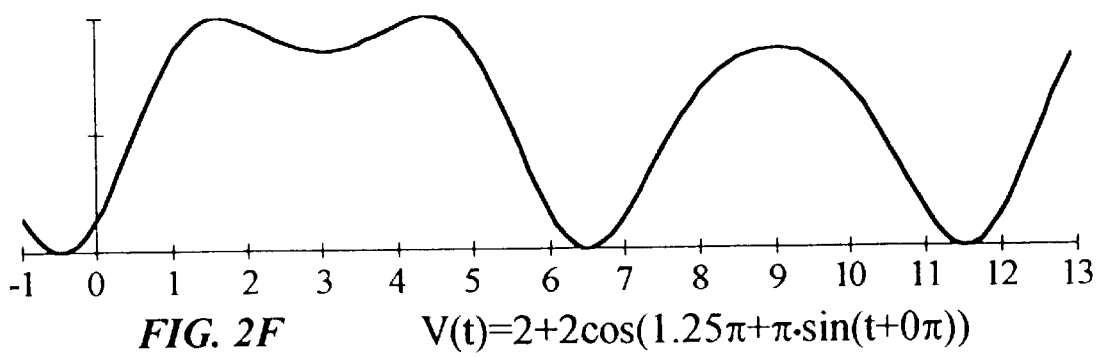
FIG. 2F  $V(t)=2+2\cos(1.25\pi+\pi\cdot\sin(t+0\pi))$
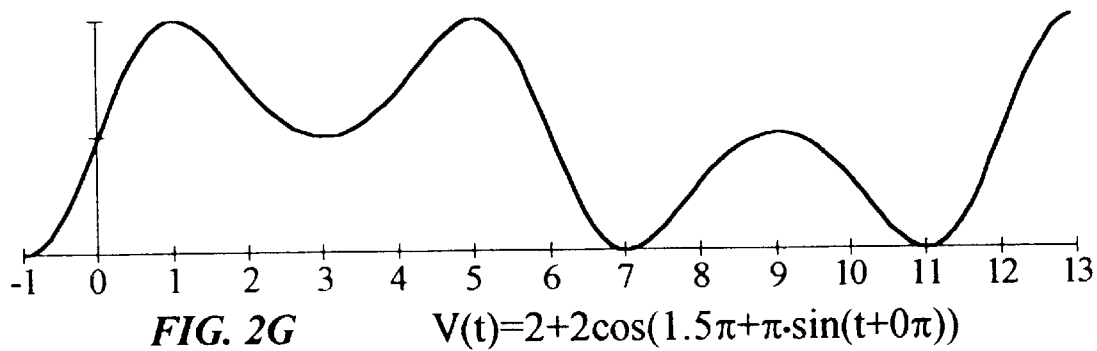
FIG. 2G  $V(t)=2+2\cos(1.5\pi+\pi\cdot\sin(t+0\pi))$
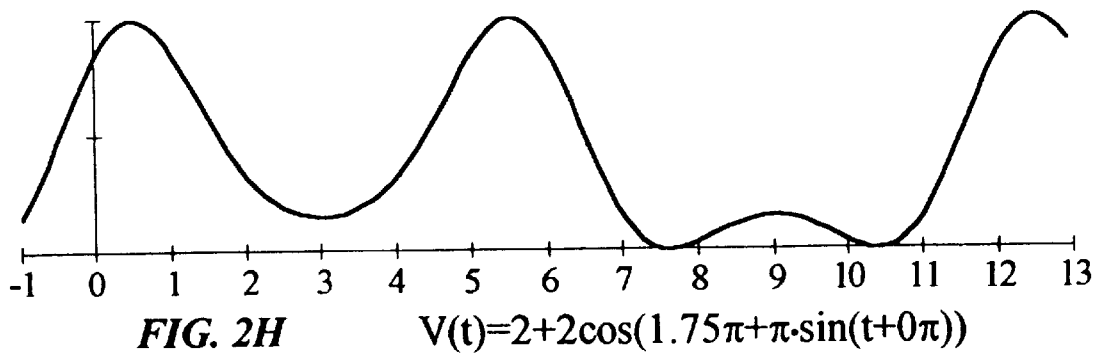
FIG. 2H  $V(t)=2+2\cos(1.75\pi+\pi\cdot\sin(t+0\pi))$

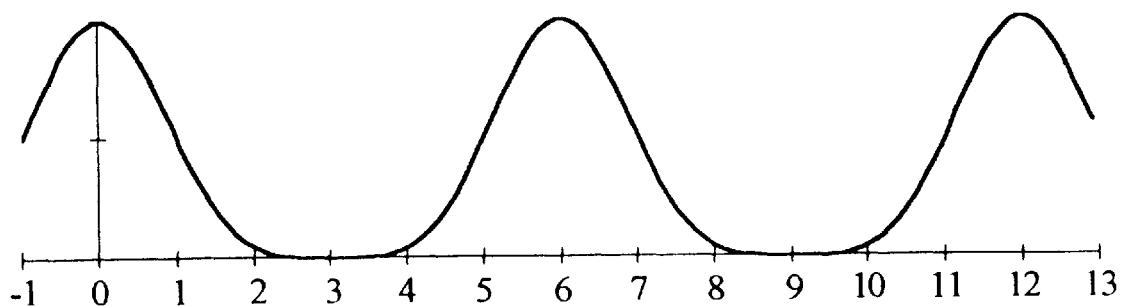
FIG. 2I    $V(t) = 2 + 2\cos(2\pi + \pi \cdot \sin(t + 0\pi))$
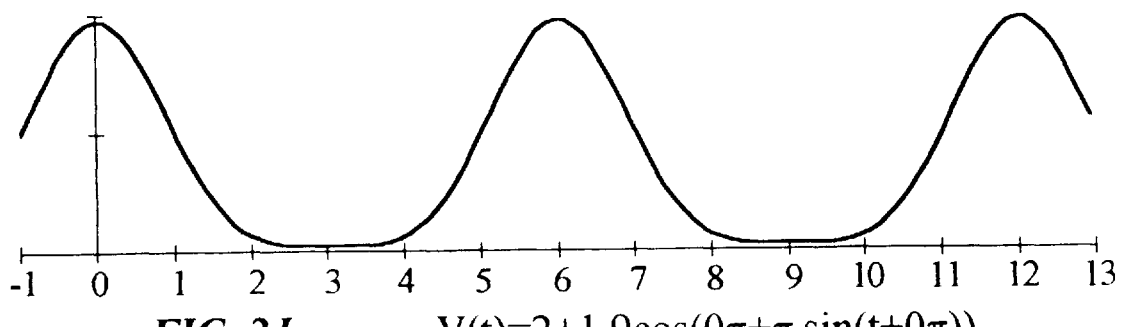
FIG. 2J    $V(t) = 2 + 1.9\cos(0\pi + \pi \cdot \sin(t + 0\pi))$
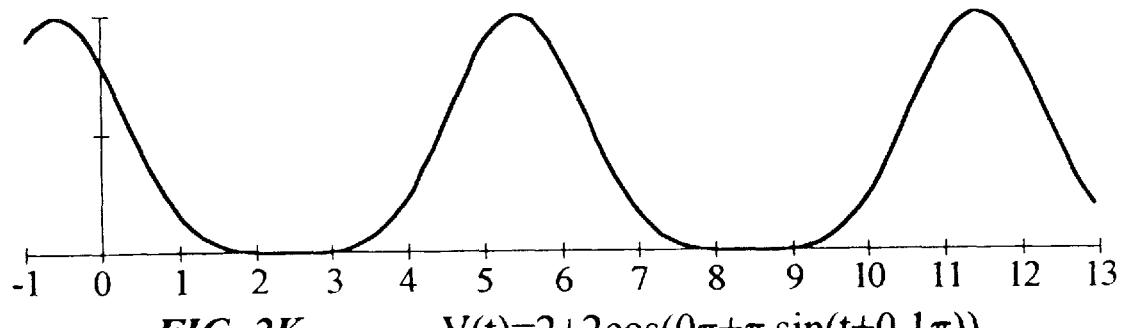
FIG. 2K    $V(t) = 2 + 2\cos(0\pi + \pi \cdot \sin(t + 0.1\pi))$
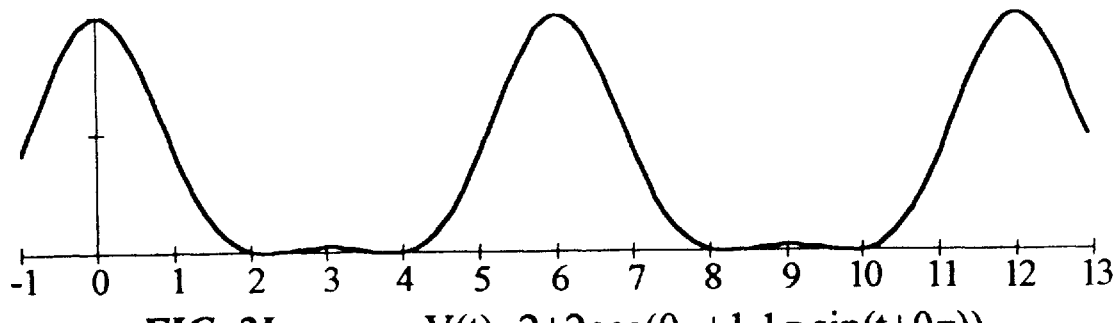
FIG. 2L    $V(t) = 2 + 2\cos(0\pi + 1.1\pi \cdot \sin(t + 0\pi))$

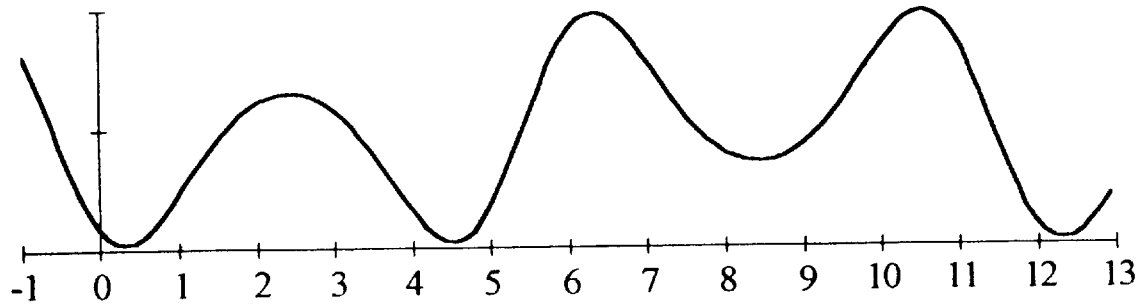
FIG. 2M  $V(t)=2+1.9\cos(0.5\pi+1.1\pi\cdot\sin(t+0.1\pi))$
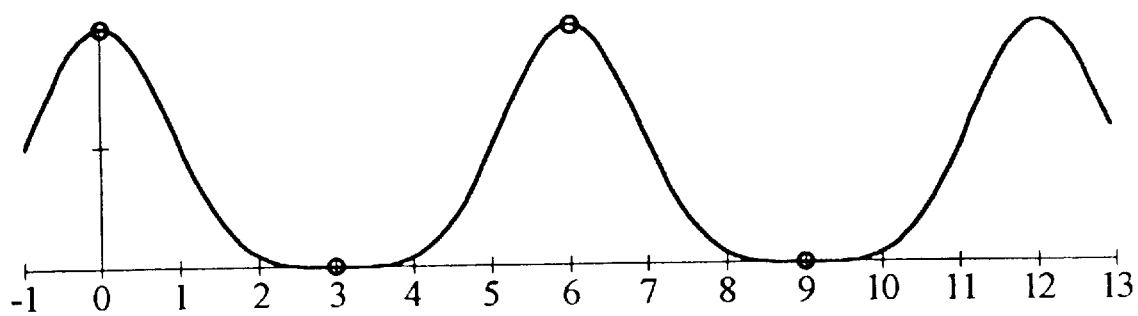
FIG. 3A
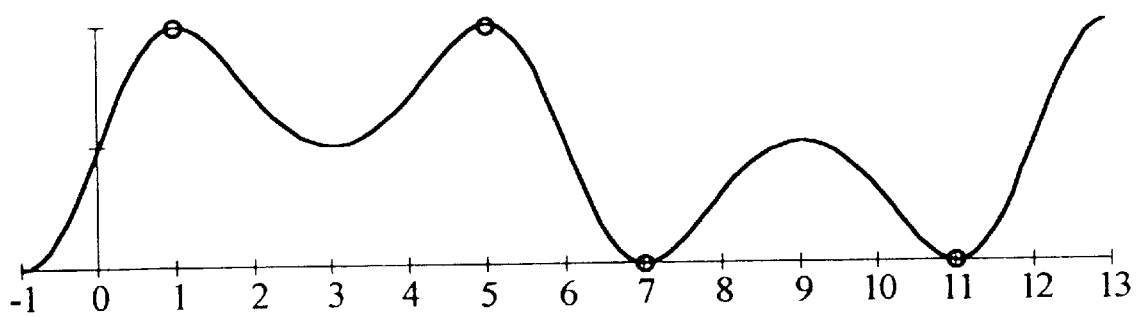
FIG. 3B

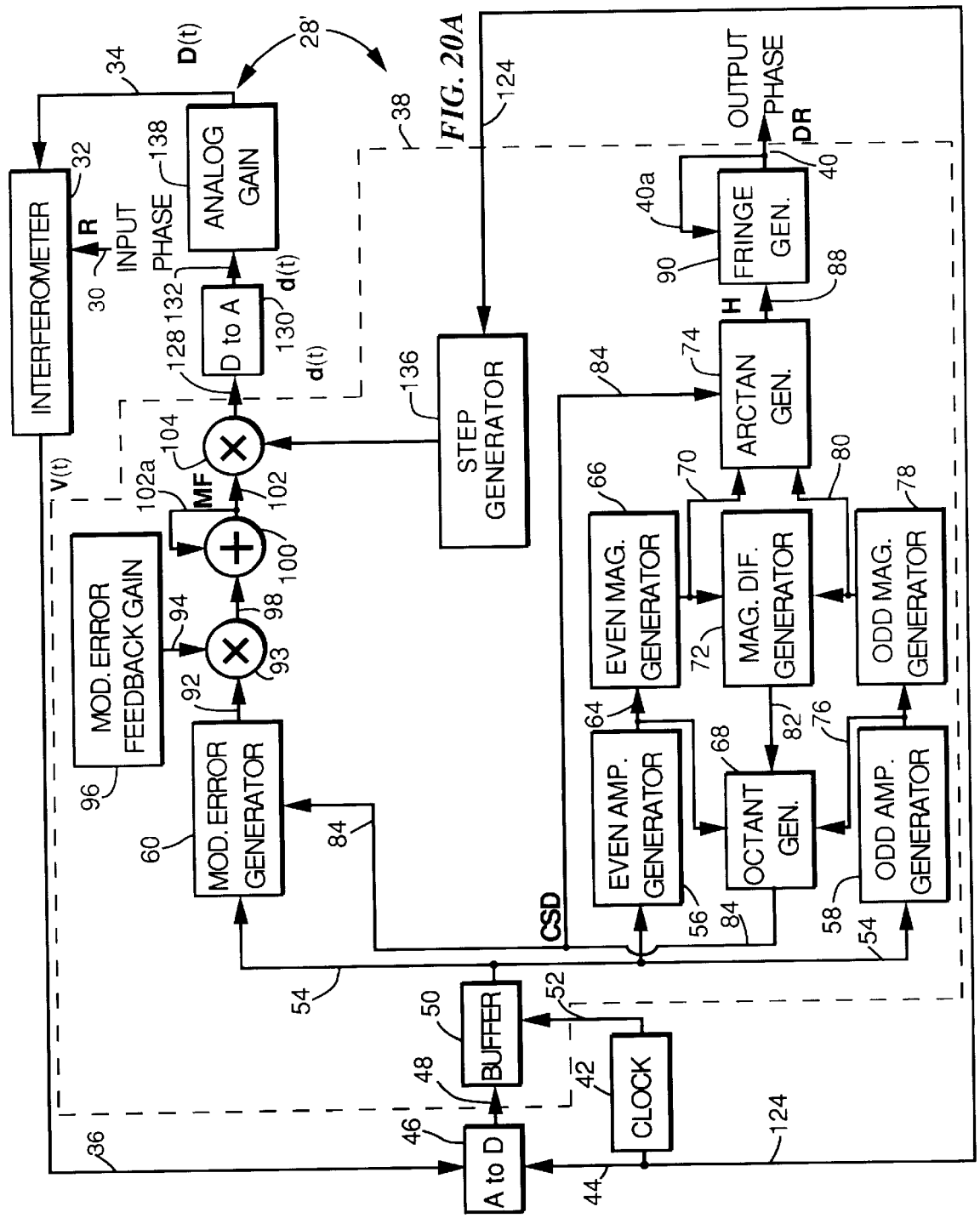

ND METHOD USEFUL
DEMODULATOR AND METHOD USEFUL FOR MULTIPLEXED OPTICAL SENSORS

This application is a continuation of U.S. application Ser. No. 08/792,402, filed Feb. 3, 1997, which is now abandoned.

FIELD OF INVENTION

The invention relates generally to interferometers and especially to apparatus and methods for measuring the input phase shift between two interfering waves where the phase shift has been summed with a modulation phase shift, such as one that has been stepped, whose amplitude and phase may be controlled to provide highly stable and wide dynamic range measurements of the input phase, especially useful when multiple sensors are multiplexed together.

BACKGROUND OF THE INVENTION

The analog output of an interferometer represents the combined power of two distinct waves. In general the two waves will interfere resulting in an average power that depends upon the cosine of the phase shift θ between the two waves. The analog output V of a detector, which measures the combined power is given by:

$$V = P_{dc} + P_{ac}\cos(\theta)$$

where, $P_{dc}$ is an offset and $P_{ac}$ is the gain of the interferometer output. Optical interferometers are the most common devices having this analog output and many utilize fiber optics to guide light waves. In optical sensor applications, an external parameter will proportionally change the phase of one or both of the light waves and the resulting change in the analog output of the light detector of the interferometer is used to sense that parameter. Examples of parameters that can affect the phase of light waves are rotation, pressure and magnetic fields. If R is the input phase shift of the interferometer induced by the parameter and r the phase shift due to other causes, then the analog output is:

$$V = P_{dc} + P_{ac}\cos(R+r)$$

This analog output V, must be used in some manner to measure the input phase R to build a useful sensor system. As it normally occurs, the analog output V is not very useful, because it is a nonlinear function of the input phase R, resulting in no output changes and sign ambiguities at many periodic operating points. Also, when R is to be measured with DC accuracy, the offset $P_{dc}$ obscures the result. Finally, changes in $P_{dc}$ or $P_{ac}$ within the bandwidth of R corrupt the measurement.

These well known limitations are the reasons that phase modulation is introduced into the system. One embodiment of the present invention is concerned with sinusoid phase modulations that are commonly known as "Phase Generated Carrier" or PGC approaches from "Homodyne Demodulation Scheme for Fiber Optic Sensors Using Phase Generated Carrier", IEEE Journal of Quantum Electronics, Oct. 1982, QE-18, No 10, pp. 1647–1653; Dandridge et al. In such systems, a device is present in the interferometer that introduces a phase shift at a constant frequency resulting in an analog output of:

$$V(t) = P_{dc} + P_{ac}\cos\{R + M\sin(t+W)\}$$

where M is the modulation depth of the interferometer, W is the phase of the modulation of the interferometer and t is the linearly increasing time in units of radians. The modulation phase defined by the term:

$$M\sin(t+W)$$

in the cosine argument is the result of a single frequency sinusoidal drive output applied to the interferometer. The way in which this drive output creates the modulation phase depends on the design of the interferometer. In rotation sensors commonly made out of Sagnac interferometers, the time difference of the sine drive output applied to a phase shifter inside the Sagnac loop gives the modulation. In time domain multiplexed acoustic sensors fabricated from Michelson interferometers, a sinusoidal variation of the light source current will induce wavelength changes which will cause the modulation phase given above. In the simplest modulator case, a fiber wrapped on a piezoelectric cylinder is placed in one arm of a Mach-Zehnder interferometer to transform its sinusoid drive into the modulation phase.

Most approaches to measuring the input phase R in the presence of a sine modulation work with the harmonic series of the analog output given by:

$$V(t) = P_{dc} + P_{ac}J_o(M)\cos R + 2P_{ac}\cos R\sum_{k=1}^{\infty}J_{2k}(M)\cos(2kt+W_{2k}) - 2P_{ac}\sin R\sum_{k=1}^{\infty}J_{2k-1}(M)\sin((2K-1)t+W_{2k-1})$$

The simplest and most limited open loop interferometric demodulation approach using PGC modulation is where the analog output is mixed with a reference signal equivalent to the frequency used to perform the modulation and low pass filtered with a gain K to the bandwidth of the input phase R. The resulting analog output is:

$$V_1 = \{2K\,P_{ac}\cos(W_1)J_1(M)\}\cdot\sin R$$

which may be viewed as a scaling factor in the curly brackets multiplied by the sine of the input phase R. When R has an absolute value less than 0.2 radians, the small angle approximation of sin R=R is valid, resulting in a linear demodulated output over the range of ±0.2 radians. The terms that make up the scale factor in the brackets point out the possible demodulation errors which this simple approach shares with many other methods. The scale factor will change with variations in the interferometer optical gain Pac, the modulation depth M, the synchronous detection phase W and the filter gain K. In the real world applications, where thermal environments may vary by 100 degrees Celsius or more, it is not uncommon to find any one of these scaling terms to change by 10% or more.

Many of those familiar with the art are knowledgeable of these effects and can, through design processes, provide some mitigation of them. For example, two reference frequencies and two synchronous detection channels will add a quadrature output term as follows:

$$V_2 = \{2K\,P_{ac}\cos(W_2)\,J_2(M)\}\cdot\cos R$$

It is evident that, with quadrature measures of the phase, either analog or digital inverse trigonometric post processing may be utilized to determine R. The analog process will be limited in range to ±π/2 radians; where a digital approach can go much further. If the quadrature terms are digitized, it is possible to implement a processing algorithm such as that defined in U.S. Pat. No. 4,789,240 in a process flow detailed in this patent's FIG. 7 (starting at the third step) which provides for an extremely large dynamic range, which is limited only by the constraint that the rate of change of phase not exceed π radians per consecutive sample. This process initially determines R to within a quadrant or octant, and then using the polarity of the quadrature terms, determines R to within the unit circle, and then using previous sample phase information is able to use simple logic to track phase as it crosses fringe boundaries. This tracking capability is limited only to the bit length of the counter used to track fringe crossings. This design and others like it show promise for large dynamic ranges if implemented in a digital format, but its measurement performance still falls short in that it provides no means of correcting scaling error terms related to modulation depth control, synchronous detector phase errors, and cross channel processing gain variations.

It would be a great improvement to the art if the linear dynamic range of an open loop interferometric demodulator could be arbitrarily large (micro-radians to millions of radians or greater) while it implemented processes, which automatically control all critical scaling factors such that they are invariant. Additionally, such a demodulator should be able to work with many different types of two-beam interferometers, such as Sagnac, Mach-Zehnder, Michelson, Low Finesse Fabry Perot, and others, and be able to efficiently demodulate the multiplexed outputs of such sensors positioned in an array.

There are a number of open loop interferometric demodulation designs described or practiced in the art, which intend to overcome the described scaling errors as well as provide larger linear dynamic ranges. U.S. Pat. Nos. 4,704,032 and 4,756,620 describe approaches which provide active compensation for amplitude scaling, but do not compensate the other scaling errors and additionally provide dynamic ranges less than 1 radian. U.S. Pat. Nos. 4,637,722; 4,687,330; 4,707,136; 4,728,192; and 4,779,975 describe approaches and improvements which compensate for, or are immune to amplitude and phase errors. These implementations also extend dynamic range, but are limited to tens of radians or less. U.S. Pat. Nos. 5,202,747; 5,289,259; 5,355,216; and 5,438,411 describe approaches and improvements which are immune to amplitude variations and to some degree, modulation depth and gain scaling variations. However these approaches are still subject to phase errors caused by band limited operation of square-law detectors and their associated electronic amplifiers. Additionally these approaches are limited in dynamic range to less than 100 radians. U.S. Pat. Nos. 4,765,739; 4,776,700; 4,836,676; 5,127,732; and 5,289,257, describe approaches which compensate for, or are immune to modulation depth and amplitude variations and are also capable of operating over large dynamic ranges. However these approaches are still subject to synchronous detection phase offsets and variations (changes in W) and additionally cross-channel gain scaling variations. U.S. Pat. Nos. 4,883,358 and 5,412,472 describe an approach which actively stabilizes field amplitude, modulation depth, and phase errors and is capable of operating over a large dynamic range. However this approach is still subject to cross channel gain scaling variations.

Although a number of the above referenced design techniques approach the desired high accuracy and large dynamic range design objective, the ones which come the closest require complex electronic circuitry. It would also be a great improvement to the art if an interferometric demodulator meeting the desired high accuracy with a large dynamic range be simple in design and implementation, and low cost in manufacture, which are traits inherent in the present invention.

SUMMARY OF THE INVENTION

In accordance with the invention, two methods and demodulator apparatuses are presented to measure the input phase in interferometer systems. The first demodulator apparatus is used with phase generated carrier interferometers and includes: an analog to digital converter, which samples the analog output of the interferometer; a clock, which provides the sample and system timing; a digital signal processing apparatus; and a digital to analog converter followed by a lowpass filter, which synthesizes the desired interferometer sine modulation drive output, which creates the phase generated carrier.

Demodulation is accomplished by sampling the interferometer output signal such that quadrature components are extracted and through an inverse trigonometric process, the interferometric phase is measured. The preferred embodiment for the first demodulator apparatus involves twelve equally spaced samples taken of the analog output of the interferometer during one modulation period to assure orthogonality (for precise quadrature signal extrication). It is recognized that fewer than twelve samples can be taken since some of the twelve samples are normally identical. With the advent of very fast integrated optic devices which can be used to form the present apparatus, and the fact that most interferometric signals are the result of physical processes which are relatively slow with respect to sample time, complete symmetry is not required to assure proper demodulation.

The twelve digital samples are processed during each modulation cycle in a fast and simple manner to provide the wide dynamic range measurement of the input phase, and the optimum amplitude update of the sine modulation drive output (modulation depth servo), and the optimum phase update of the sine modulation drive output (modulation phase servo). The modulation depth and phase servos are employed to assure an accurate measurement of the input phase.

The dynamic range of the input phase measurement is extended to arbitrarily large values by tracking fringe crossings, which only require that the input phase change by less than $\pi$ radians during the time of one modulation cycle, which is almost a given when high speed components and physical processes are involved.

As for the second apparatus, the samples may also be generated by shifting the phase of the phase modulation in steps such as at 0, $\pm\pi/2$, $\pm.866\pi$, and $\pm\pi$ radians. The steps do not have to be generated in any particular order. In fact, in the first described apparatus, discrete samples at specific phases of the sinusoidal modulation are taken even though the phase modulation is continuously changing. Therefore the interferometer can be modulated by a signal with twelve discrete steps or less which represent the phase modulation levels that equate to the levels taken at the twelve or less discrete times in the first apparatus discussed. The reason that twelve discrete steps are normally used even though only eight or less are needed, is it is very convenient to run an analog to digital converter used in the sampling process at a fixed rate and "throw away" the unneeded samples, which are not evenly distributed in the sample stream. With a preferred modulation depth of $\pi$ radians, the twelve modulation signals are 0, $\pm\pi/2$, $\pm.866\pi$, $+\pi$, $+.866\pi$, $+\pi/2$, 0. $-\pi/2$, $-.866\pi$, $-\pi$, $-.866\pi$, $-\pi/2$ with the four resultant signals from the $\pm.866\pi$ signals being discarded. Since one of the resultant signals from the 0, $+\pi/2$, and $-\pi/2$ modulation steps are redundant with the other, it is possible to discard one of the resultant signals from the 0, $+\pi/2$, and $-\pi/2$ modulation steps with only a slight degrading of the signal-to-noise ratio of the apparatus. Therefore, only five discreet levels of modulation and sampled signals are needed to perform the demodulation process, while the same benefits and accuracy of the sine wave modulation approach of the first apparatus are achieved. Since the modulation is not constrained to a continuous sinusoidal modulation, this discreet modulation approach is advantageous for high speed demodulation of single element sensors or when an array of sensors are being interrogated, using time division multiplexing with a single demodulator. A typical system would send a set of modulation steps into a serial array, letting the physical separation and the constant speed of light separate the resultant signals in time.

Therefore, it is an object of the present invention to provide improved open loop demodulation apparatus with a large dynamic range and high accuracy that takes advantage of improved components so that the phase outputs of singular sensors or an array of sensors which can be separated and determined by a single demodulator.

Another object is to reduce the number of samples required to demodulate a phase shifting interferometer output.

Another object is to reduce the cost of apparatus to demodulate the output of multiple interferometers.

Another object is to reduce the size and the number of components required to demodulate the outputs of interferometers.

Another object is reduce errors, characteristic of interferometers by sensing them and feeding back correction signals thereto.

These and other objects and advantages of the present invention will become apparent to those skilled in the art after considering the following detailed specification, together with the accompanying drawings wherein:

BRIEF DESCRIPTION OF THE DRAWINGS

FIG. 1 is a schematic block diagram of an orthogonal demodulation and modulation apparatus in accordance with a preferred embodiment of the invention in conjunction with an interferometer;

FIGS. 2A through 2I are graphs of computer generated wave forms showing how phase changes in the output of the interferometer of FIG. 1, as expressed by the formula $V(t)=P_{dc}+P_{ac}\cos\{R+M\sin(t+W)\}$, change its output wave form when $P_{ac}$, M, and W are constant;

FIG. 2J is a graph of a computer generated wave form showing how a change in $P_{ac}$ changes the output of the interferometer of FIG. 1;

FIG. 2K, is a graph of a computer generated wave form showing how a change in M changes the output of the interferometer of FIG. 1;

FIG. 2L is a graph of a computer generated wave form showing how a change in W changes the output of the interferometer of FIG. 1;

FIG. 2M is a graph of a computer generated wave form showing how complex and consequently how difficult the output of the interferometer of FIG. 1 is to demodulate when $P_{ac}$ R, M, and W are all changing;

FIG. 3A is a graph of the even component of the nominal analog output of the interferometer of FIG. 1 in accordance with the invention, which is marked with sample points that are used to measure its amplitude;

FIG. 3B is a graph of the odd component of a nominal analog output of the interferometer of FIG. 1 which is marked with sample points that are used to measure its amplitude;

FIG. 20A is a schematic block diagram of an orthogonal demodulation and modulation apparatus in accordance with a preferred embodiment of the invention in conjunction with an interferometer where the modulation input to the interferometer is in steps;

DETAILED DESCRIPTION OF THE PREFERRED EMBODIMENTS

Figure 3C:
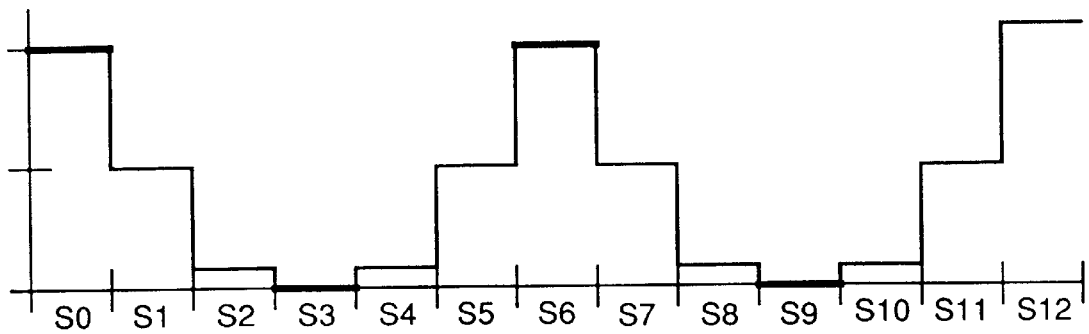
FIG. 3C is a graph of the even component shown in FIG. 3A after it has been digitized with the samples indicated by wide lines.

FIG. 1 is a detailed block diagram of the present invention 28, which measures the absolute phase within $2\pi$ radians and the number of $2\pi$ radian variations since turn on, in an analog input phase signal 30 and converts such into a digital representation of the phase during each modulation cycle. The measurement is accomplished by inputting the phase signal 30 to an interferometer 32 where it is summed with D(t), a controlled sinusoidal feed back signal 34 to produce V(t), an analog output signal 36, which after being digitized, is processed in a digital signal processor 38 to produce: a varying digital output phase signal 40 that follows the variations of the input phase signal 30; and D(t), the controlled sinusoidal feed back signal 34.

The nature of interferometers, such as interferometer 32, is that they produce the analog output signal 36 expressed as:

$$V(t) = P_{dc} + P_{ac}\cos\{R + M\sin(t+W)\}$$

In this expression, $P_{dc}$ is a constant amplitude offset, $P_{ac}$ is the amplitude of the modulated output of the interferometer 32, R is the input phase in radians, M is a modulation depth of the interferometer 32 in radians, W is a phase of the modulation of the interferometer 32 in radians and t is time converted to units of radians. FIGS. 2A through 2I illustrate how V(t) changes as the input phase (R) signal 30 changes from 0 to $2\pi$ in $0.25\pi$ increments when $P_{dc}$, $P_{ac}$, M, and W are constant. In a well designed interferometer, $P_{dc}$ and $P_{ac}$ are equal, with any changes in $P_{ac}$ being changes that reduce its value. FIG. 2J illustrates how a reduction in $P_{ac}$ below $P_{dc}$ reduces the peak to peak amplitude of V(t). FIG. 2K illustrates how an increase in the phase of the modulation W shifts V(t) to the left, FIG. 2L illustrates how an increase in the modulation depth M changes the modulation of V(t), and FIG. 2M illustrates how complex V(t) can become when $P_{ac}$, R, W, and M are all changing. This complexity has heretofore required expensive and complex demodulators to extract the phase R from the other possible variables.

The analog output V(t) results from the phase of the interferometer 32 being sine modulated by a linear transformation of output 34, which is provided by the processor 38. The sine modulation output 34 is proportional to the expression:

$$MF \cdot \sin(t + WF)$$

In this expression, MF is the feedback modulation depth-output and WF is the feedback phase of the modulation output. The design of the interferometer 32 is such that M is proportional to MF and that W is equal to WF plus a radian offset. The output signal 36 is fed to the processor 38, which computes the output phase signal 40 from the input phase signal 30 as explained below.

The processor 38 automatically and continuously changes the values of the feedback modulation depth MF and the feedback phase of the modulation WF so as to keep the modulation depth M of the interferometer 32 very close to $\pi$ radians and the phase of the modulation W of the interferometer 32 at a value that maximizes the gain and minimizes the effects of noise on the output phase signal 40. There are many types of interferometers 32 that will transform a sine modulation D(t) and an input phase signal 30 into the analog output V(t) and the present invention is not limited to the use of one type.

A clock 42 controls the operation sequence of the invention 28. One output 44 from the clock 42 triggers an analog to digital converter (A to D) 46 to sample the interferometer analog output 36. The output 48 of the analog to digital converter 46 is a series of twelve digital numbers, which digitally represents the interferometer analog output 36. The series of numbers are transferred to a sample buffer 50 and stored. A modulation cycle output 52 from the clock 42 is the modulation cycle clock, at one twelfth the rate of the output 44. Thus, twelve equally spaced samples are taken of the interferometer analog output 36, V(t)during one modulation cycle.

The mathematical identity:

$$\cos(a+b) = (\cos(a)\cos(b)) - (\sin(a)\sin(b))$$

can be applied to the analog output V(t) to give the expression:

$$V(t) = P_{dc} + P_{ac}\cos(R) \cdot \cos\{M\sin(t + W)\} - P_{ac}\sin(R) \cdot \sin\{M\sin(t + W)\}$$

By substituting an even modulation function E(t) and an odd modulation function O(t), which are defined as follows:

$$E(t)=\cos\{M\sin(t+W)\}$$

$$O(t)=\sin\{M\sin(t+W)\}$$

the analog output 36 of the interferometer 32 is expressed as:

$$V(t)=P_{dc}+P_{ac}\cos(R)\cdot E(t)-P_{ac}\sin(R)\cdot O(t)$$

The terms "even" and "odd" refer to the behavior of the modulation functions when the time is shifted by π radians. The even function responds as follows:

$$\begin{aligned}E(t+\pi) &= \cos\{M\sin(t+W+\pi)\}\\ &= \cos\{M\sin(t+W)\cdot\cos\pi + M\cos(t+W)\cdot\sin\pi\}\\ &= \cos\{-M\sin(t+W)\}\\ &= \cos\{M\sin(t+W)\}\\ &= E(t)\end{aligned}$$

and is seen to reproduce itself in the second half of the 2π modulation cycle. The odd function responds as follows:

$$\begin{aligned}O(t+\pi) &= \sin\{M\sin(t+W+\pi)\}\\ &= \sin\{M\sin(t+W)\cdot\cos\pi + M\cos(t+W)\cdot\sin\pi\}\\ &= \sin\{-M\sin(t+W)\}\\ &= -\sin\{M\sin(t+W)\}\\ &= -O(t)\end{aligned}$$

and is inverted in the second half of the 2π modulation cycle. These even and odd properties are the basis of the orthogonal demodulation process, which is automated in the processor 38, because the modulation functions E(t) and O(t) form an orthogonal pair with respect to sample time shifts of π so that one can be measured while the other is rejected.

Consider the addition of two samples of the analog output separated by a radian time π as shown below:

$$\begin{aligned}V(t+\pi)+V(t) &= P_{dc} + P_{ac}\cos(R)\cdot E(t) + P_{ac}\sin(R)\cdot O(t) + P_{dc} +\\ &\quad P_{ac}\cos(R)\cdot E(t) - P_{ac}\sin(R)\cdot O(t)\\ &= 2P_{dc} + 2P_{ac}\cos(R)\cdot E(t)\end{aligned}$$

The sum contains the amplitude of the even modulation function E(t) while completely suppressing the odd modulation function O(t). Now consider the subtraction of two samples of the analog output separated by a radian time E as shown below:

$$\begin{aligned}V(t+\pi)-V(t) &= P_{dc} + P_{ac}\cos(R)\cdot E(t) + P_{ac}\sin(R)\cdot O(t) -\\ &\quad P_{dc} - P_{ac}\cos(R)\cdot E(t) + P_{ac}\sin(R)\cdot O(t)\\ &= 2P_{ac}\sin(R)\cdot O(t)\end{aligned}$$

This difference contains the amplitude of the odd modulation function O(t) while completely suppressing the even modulation function E(t).

As aforesaid, the occurrence of the modulation cycle output 52 causes the twelve samples in the sample buffer 50 to be transferred through a sample buffer output 54, which transfers the samples to an even component amplitude generator 56, and an odd component amplitude generator 58, as well as a modulation depth error generator 60, and a sample phase error generator 62, which will be discussed later. The samples will be denoted in order by S0, S1, S2, S3, S4, S5, S6, S7, S8, S9, S10 and S11 hereinafter.

The even component amplitude generator 56 forms a number CR from a linear combination of four of the twelve samples buffered during the previous modulation cycle. This number from output 64 is proportional to the cosine of the input phase 30. The number CR is given by the following expression:

$$CR=S0-S3+S6-S9$$

with S0, S3, S6, and S9 being the locations of the minimum and maximum points of the nominal even component as shown in FIG. 3A. This number from output 64 is transferred to an even component magnitude generator 66 and an octant generator 68. The number from output 70 of the even component magnitude generator 66 is the absolute value of the number from input 64. The number from output 70 is proportional to the absolute value of the cosine of the interferometer input phase 30. The number from output 70 is transferred to a magnitude difference generator 72 and an inverse tangent (arctan) generator 74.

The odd component amplitude generator 58 forms a number SR from a linear combination of four of the twelve samples buffered during the last modulation cycle. This number from output 76 is proportional to the sine of the input phase 30. The number SR is given by the following expression:

$$SR=S7+S11-S5-S1$$

with S1, S5, S7, and S11 being the locations of the minimum and maximum points of the nominal odd component as shown in FIG. 3B. This number from output 76 is transferred to the odd component magnitude generator 78 and the octant generator 68. The number from output 80 of the odd component magnitude generator 78 is the absolute value of the number from input 76. The number from output 80 is proportional to the absolute value of the sine of the interferometer input phase 30. The number from output 80 is transferred to the magnitude difference generator 72 and the inverse tangent generator 74.

The magnitude difference generator 72 subtracts the magnitude of the odd component from output 80 from the magnitude of the even component from output 70. The sign from number from output 82 determines which octant within a quadrant contains the resultant vector of the modulation components. The number from output 82 is transferred to the octant generator 68.

The output 84 from the octant generator 68 is a number having a value of 0, 1, 2, 3, 4, 5, 6 or 7. This number is formed using the three sign bits of the numbers from output 64, output 76 and output 82 (conventionally 0=+, 1 =−)

The calculation that measures the even modulation function also measures the DC term Pdc. This undesirable property can be removed and the gain doubled by subtracting a second sum taken at a different time radian T as shown below:

$$\{V(t+\pi)+V(t)\}-\{V(T+\pi)+V(T)\}=2P_{ac}\cos(R)\cdot\{E(t)-E(T)\}$$

The gain can also be doubled for the odd function as shown in the expression below:

$$\{V(t+\pi)-V(t)\}+\{V(T+\pi)-V(T)\}=2P_{ac}\sin(R)\cdot\{O(t)+O(T)\}$$

These measures, which are proportional to the cosine and the sine of the input phase R, were derived independent of the values of the modulation depth of the interferometer M and the phase of the modulation of the interferometer W and so are completely independent of these parameters. However, a good demodulator should maximize the gain and minimize the operating errors whenever possible. FIG. 3A is a graph of the even modulation function E(t) with M equal to $\pi$ and W equal to zero on a scale where there are twelve samples in a $2\pi$ modulation cycle, which is $\pi/6$ radians between samples. The even modulation function E(t) is shown in digitized form in FIG. 3C. The horizontal axis is labeled in integer multiples of $\pi/6$ radians. This graph suggests the following measure for the even modulation function in terms of the $\pi/6$ samples S:

$$CR=(S6+S0)-(S9+S3)=2P_{ac}\cos(R)\cdot\{E(0)-E(3\pi/6)\}$$

Figure 3D:
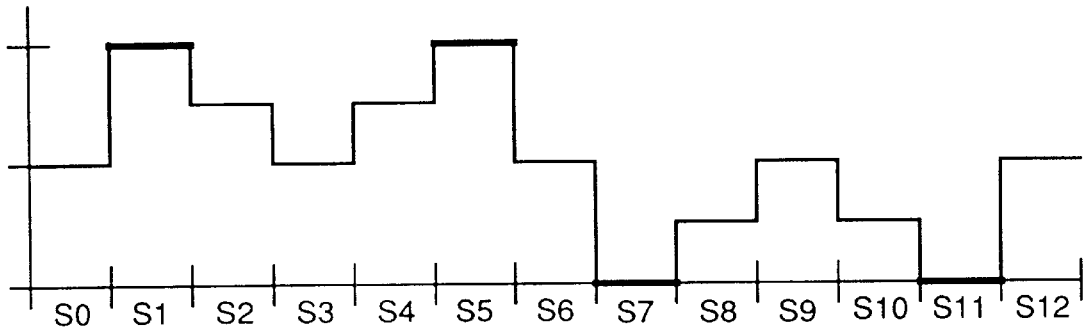
FIG. 3D is a graph of the odd component shown in FIG. 3B after it has been digitized with the samples indicated by wide lines.

FIG. 3B is a graph of the odd modulation function O(t) in the same manner, O(t) being shown in digitized form in FIG. 3D, and suggests the following measure of its amplitude:

$$SR=(S7-S1)+(S11-S5)=2\,P_{ac}\sin(R)\cdot\{O(\pi/6)+O\,(5\pi/6)\}$$

The independent measurement of CR and of SR does not depend upon the values of M or W, but they will have maximum and equal gains and minimum sensitivity to variation in these two parameters when M is equal to $\pi$ and W is equal to zero where:

$$CR=S6+S0-S9-S3=4P_{ac}\cos(R)$$

$$SR=S7-S1+S11-S5=4P_{ac}\sin(R)$$

Figure 4A:
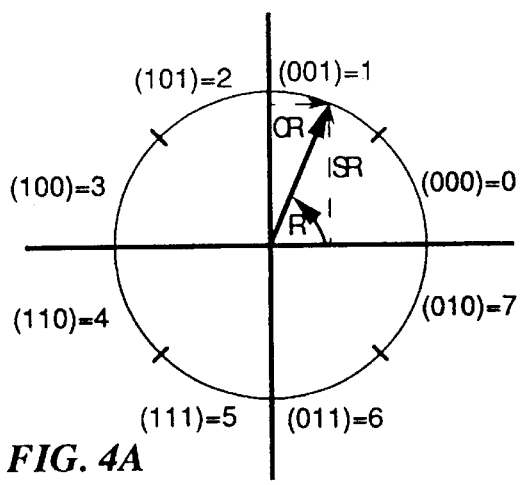
FIG. 4A is a diagram of the vector at the phase R, its orthogonal components CR and SR, and the octant in which the vector is located.

The goal of the demodulator 28 is to measure the input phase R. This can be done by noting that the line from the origin to the point (CR, SR) in the Cartesian plane is at an angle R from the x axis (FIG. 4A). The octant containing this demodulation vector can be identified by first finding the quadrant through the signs of its components CR and SR and then finding the octant within that quadrant by the sign of the difference D=X-Y of their absolute values X and Y respectively. These three sign bits form an index CSD, which has a value of from 0 to 7, which is mapped to the octant number by the following table:

| sign of CR | sign of SR | sign of D | CSD | octant |
|---|---|---|---|---|
| 0 | 0 | 0 | 0 | 0 |
| 0 | 0 | 1 | 1 | 1 |
| 1 | 0 | 1 | 5 | 2 |
| 1 | 0 | 0 | 4 | 3 |
| 1 | 1 | 0 | 6 | 4 |
| 1 | 1 | 1 | 7 | 5 |
| 0 | 1 | 1 | 3 | 6 |
| 0 | 1 | 0 | 2 | 7 |

The number CSD from output 84 identifies the octant containing the resultant vector whose components are the even component amplitude vector CR and the odd component amplitude vector SR. The number from output 84 is transferred to the modulation depth error generator 60, the sample phase error generator 62, the inverse tangent generator 74, and a sample phase error feedback gain 86.

By identifying the octant containing the demodulation vector, the input phase can be found by computing the inverse tangent or cotangent of the magnitude components X and Y in the first octant where the output range is restricted from 0 to $\pi/4$ radians.

The inverse tangent generator 74 computes the output phase number, which measures the input phase signal 30 modulo $2\pi$ radians. This number is a component of output 40. It is formed by computing the inverse tangent of the positive magnitude components X, which is the number from output 70, and Y, which is the number from output 80, and adding an offset phase as determined by the octant number. The substitution ATAN(X/Y)= ACOT(Y/X) can be made at will depending on the needs of the processor hardware. The computation for each octant number is given below.

| 0 | ATAN(Y/X) |
|---|---|
| 1 | $\pi/2$ − ATAN(X/Y) |
| 2 | $\pi/2$ + ATAN(X/Y) |
| 3 | $\pi$ − ATAN(Y/X) |
| 4 | $\pi$ + ATAN(Y/X) |
| 5 | $3\pi/2$ − ATAN(X/Y) |
| 6 | $3\pi/2$ + ATAN(X/Y) |
| 7 | $2\pi$ − ATAN(Y/X) |

The domain of the inverse tangent computation is the first octant between 0 radians and $\pi/4$ radians. The domain is further restricted to the first half octant between 0 radians and $\pi/8$ radians by the following mathematical procedure, which finds the replacement value of ATAN(b/a):

IF $\{b - a(\sqrt{2} - 1)\} \le 0$ THEN ATAN$(b/a)$

ELSE $(\pi/4)$ − ATAN$\{(a - b)/(a + b)\}$

The inverse tangent in the first half octant can be precisely evaluated by the approximate Taylor series:

$$\text{ATAN}(Z) \approx Z - Z\left\{Z^2\left(\frac{1}{3} - Z^2\left(\frac{1}{5} - Z^2\left(\frac{1}{7} - Z^2\left(\frac{1}{9} - \frac{Z^2}{11}\right)\right)\right)\right)\right\}$$

Once this has been accomplished in the arctan generator 74, the number, H from output 88 thereof is transferred to a fringe generator 90. The fringe generator 90 adds the updated fringe, which is an integer multiple of $2\pi$, to the output phase number H. The resulting number DR, which is the demodulated output phase signal 40, is formed from the demodulated output phase 40(a) of the previous modulation cycle and the current output phase 40 by tracking fringe crossings. A fringe is crossed when the current output phase 40 changes by more that X radians from the previous output phase, which is contained in the $2\pi$ fraction of the demodulated output phase number 40. When the current output phase has increased more than $\pi$ radians from the previous output phase, the demodulated output phase 40 is decremented by $2\pi$ radians. When the current output phase 40 has decreased more than $\pi$ radians from the previous output phase, the demodulated output phase 40 is incremented by $2\pi$ radians. Fringe crossings are properly detected so long as the input phase 30 changes less than $\pi$ radians during a modulation cycle. This restriction limits the upper phase change rate response, but if a particular application is likely to approach the response limit, then higher speed components and clock timing is used.

Figure 4B:
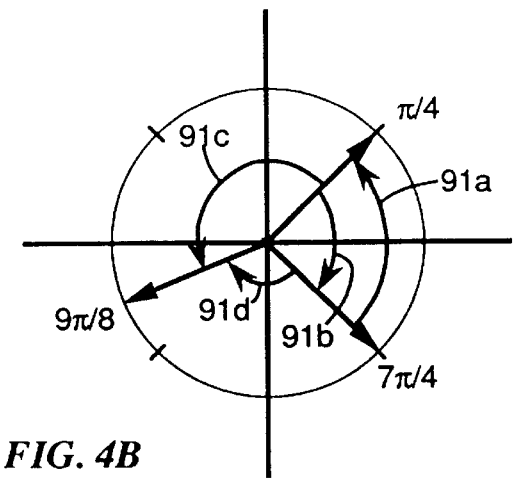
FIG. 4B is a diagram showing how a fringe crossing is determined from changes in the phase R of the vector of FIG. 4A.

FIG. 4B illustrates why the fringe crossings can be counted in this manner. In FIG. 4B, vectors are shown at $\pi/4$, $9\pi/8$, and $7\pi/4$. If, as shown by arrow 91a, the output changes from $7\pi/4$ to $\pi/4$, the output decreases $3\pi/2$ (more than $\pi$) and the fringe generator 90 is incremented. If, as shown by arrow 91b, the output changes from $\pi/4$ to $7\pi/4$, the output increases $3\pi/2$ (more than $\pi$) and the fringe generator 90 is decremented. When the vector changes less than $\pi$, as shown by arrow 91c from $\pi/4$ to $9\pi/8$ ($7\pi/8$) or by arrow 91d from $7\pi/4$ to $9\pi/8$ ($5\pi/8$), the previous fringe number is retained.

The inverse tangent can be used to find the output phase modulo $2\pi$ from the magnitude components X and Y when their gains are equal. That is when X=4 $P_{ac}$ |cos(R)| and Y=4 $P_{ac}$ |sin(R)|, their equal gains of 4 $P_{ac}$ makes their ratio:

$$\frac{Y}{X} = \frac{|\sin R|}{|\cos R|} = \text{TAN}(R)$$

The condition of equal gains will not hold for every value of the modulation depth of the interferometer M and the phase of the modulation of the interferometer W. For this reason and to optimize the performance of the demodulator, M should be held at a value of E radians and W should be maintained at a value of zero.

Consider the four measures below formed from combinations of the twelve samples:

$$CM=(S7+S1)-(S6+S0)+(S11+S5)-(S9+S3)$$

$$SM=(S9-S3)$$

$$CW=(S7+S1)-(S11+S5)$$

$$SW=-(S6-S0)$$

These measures are all combinations of sums or differences of samples separated by n radians and therefore have the orthogonal property with respect to the even and odd modulation components E(t) and O(t). The measure CM rejects O(t) and measures E(t) and is called the even modulation depth error. The measure CW rejects O(t) and measures E(t) and is called the even phase error. The measure SM rejects E(t) and measures O(t) and is called the odd modulation depth error. The measure SW rejects E(t) and measures O(t) and is called the odd phase error.

Figure 5:
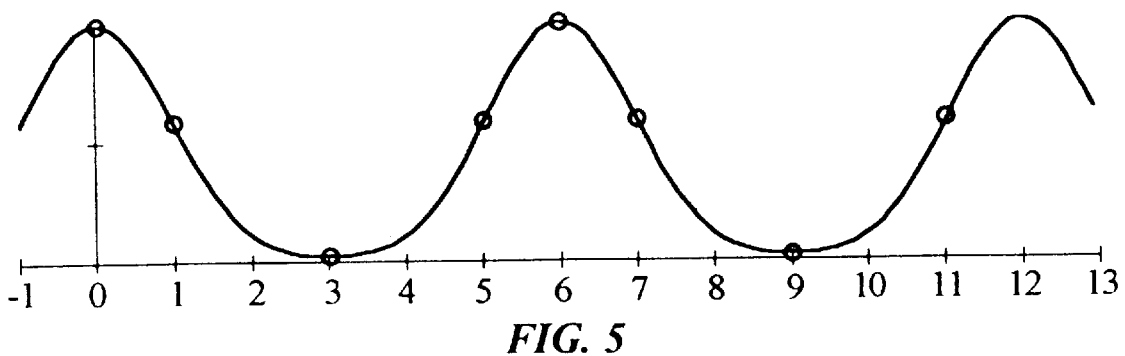
FIG. 5 is a graph of the even component of the analog output of the interferometer of FIG. 1 having a modulation depth of $9\pi/10$ radians, which is marked with sample points that are used to measure the modulation depth deviation from $\pi$ radians.
Figure 6:
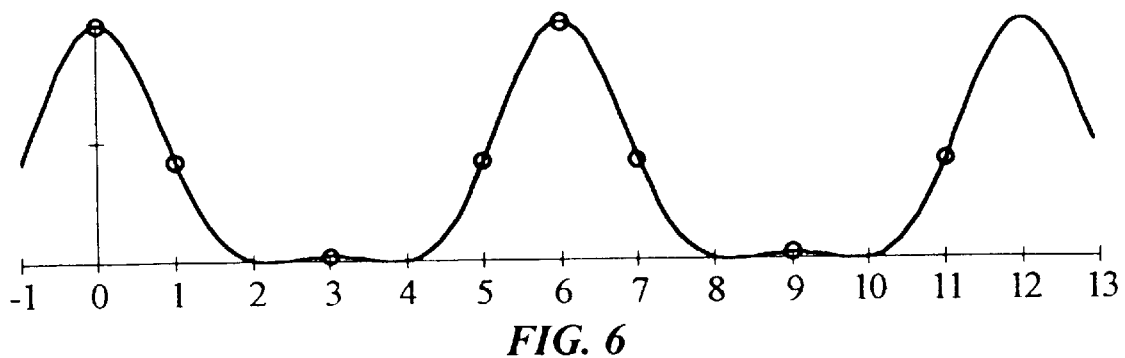
FIG. 6 is a graph of the even component of the analog output of the interferometer of FIG. 1 having a modulation depth of $11\pi/10$ radians, which is marked with sample points that are used to measure the modulation depth deviation from $\pi$ radians.
Figure 7:
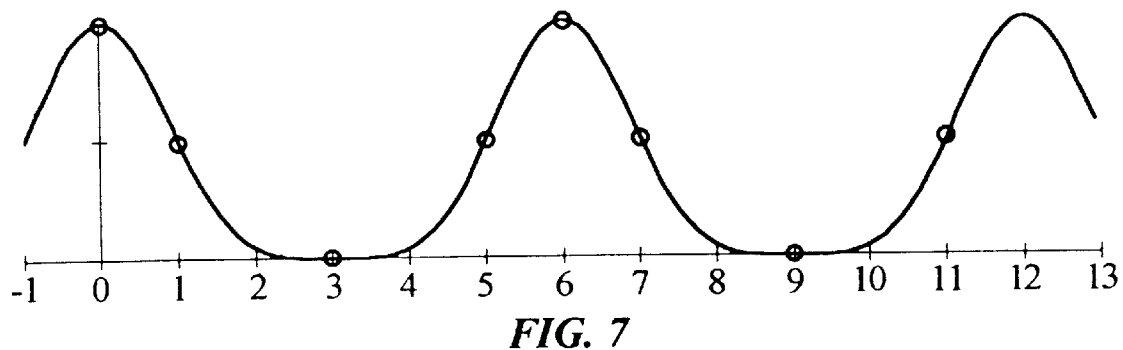
FIG. 7 is a graph of the even component of the analog output of the interferometer of FIG. 1 having a modulation depth of $\pi$ radians, which is marked with sample points that are used to measure the modulation depth deviation from $\pi$ radians.
Figure 8:
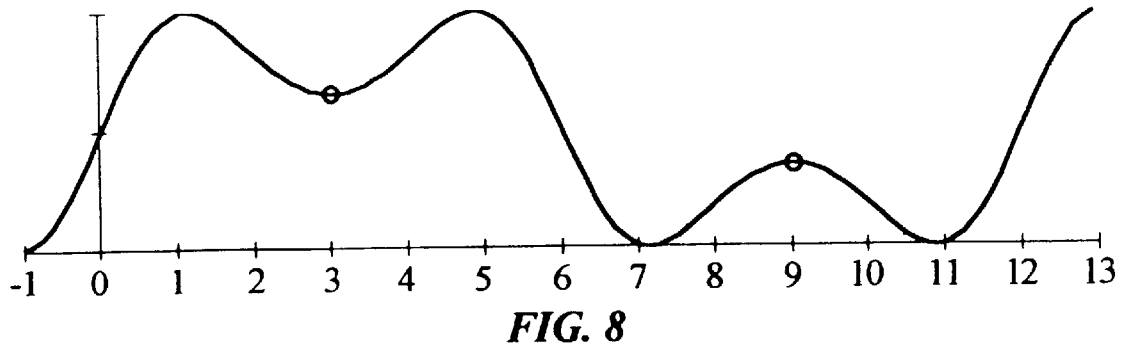
FIG. 8 is a graph of the odd component of the analog output of the interferometer of FIG. 1 having a modulation depth of $9\pi/10$ radians, which is marked with sample points that are used to measure the modulation depth deviation from $\pi$ radians.
Figure 9:
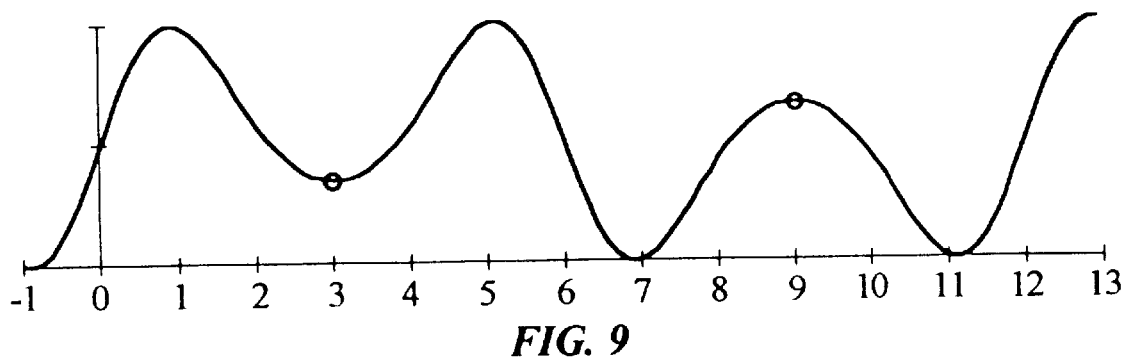
FIG. 9 is a graph of the odd component of the analog output of the interferometer of FIG. 1 having a modulation depth of $11\pi/10$ radians, which is marked with sample points that are used to measure the modulation depth deviation from $\pi$ radians.
Figure 10:
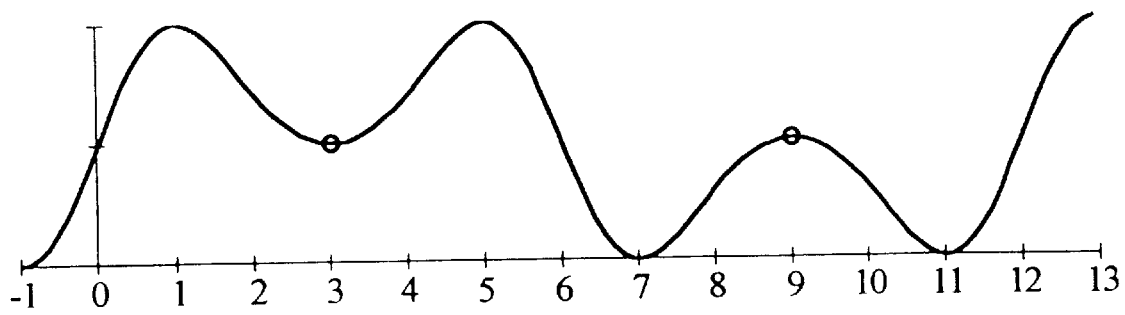
FIG. 10 is a graph of the odd component of the analog output of the interferometer of FIG. 1 having a modulation depth of $\pi$ radians, which is marked with sample points that are used to measure the modulation depth deviation from $\pi$ radians.

FIG. 5 shows the samples of CM on the even modulation function E(t), which has a modulation depth M of $0.9\pi$ and a phase W of zero. The graph shows that the difference of the sample sums, (S7+S1)-(S6+S0) measures the distance from the middle level to the maximum of E(t) and the difference of the sample sums, (S11+S5)-(S9+S3) measures the distance from the middle level to the minimum of E(t). The resulting value of CM clearly will be positive. FIG. 6 shows the samples of CM on the even modulation function E(t), which has a modulation depth M of $1.1\pi$ and a phase W of zero. The value of CM in this case clearly will be negative. FIG. 7 shows the samples of CM on E(t) where M is $\pi$ radians and W is zero and it is clear that CM is now zero. The measure CM thus forms a modulation depth error using the even modulation function with a null operating point when M is $\pi$ radians. The same demonstration is done with SM using the odd modulation function O(t) in FIG. 8 where M is $0.9\pi$, in FIG. 9 where M is $1.1\pi$, and FIG. 10 where M is $\pi$ radians. SM is seen to form a modulation depth error using the odd modulation function with a null operating point when M is $\pi$ radians.

Figure 11:
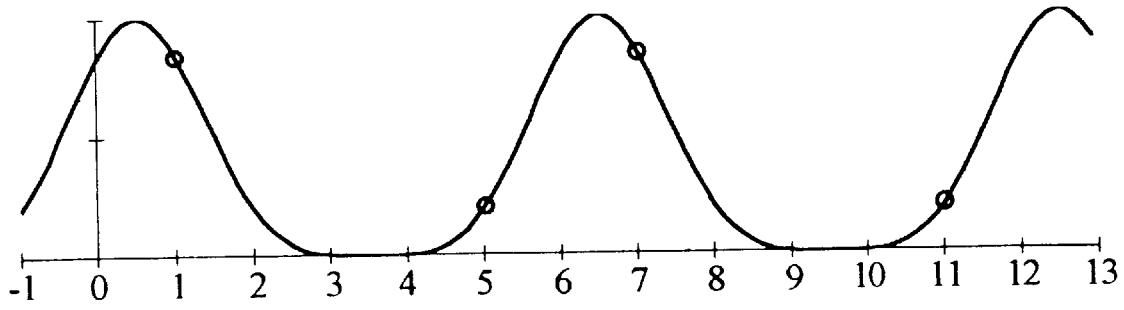
FIG. 11 is a graph of the even component of the analog output of the interferometer of FIG. 1 having a sampling phase of minus $\pi/12$ radians, which is marked with sample points that are used to measure the sampling phase deviation from 0 radians.
Figure 12:
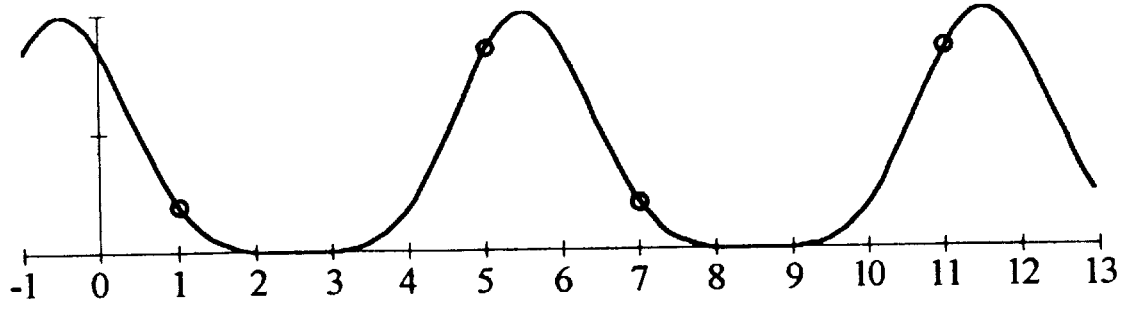
FIG. 12 is a graph of the even component of the analog output of the interferometer of FIG. 1 having a sampling phase of $\pi/12$ radians, which is marked with sample points that are used to measure the sampling phase deviation from 0 radians.
Figure 13:
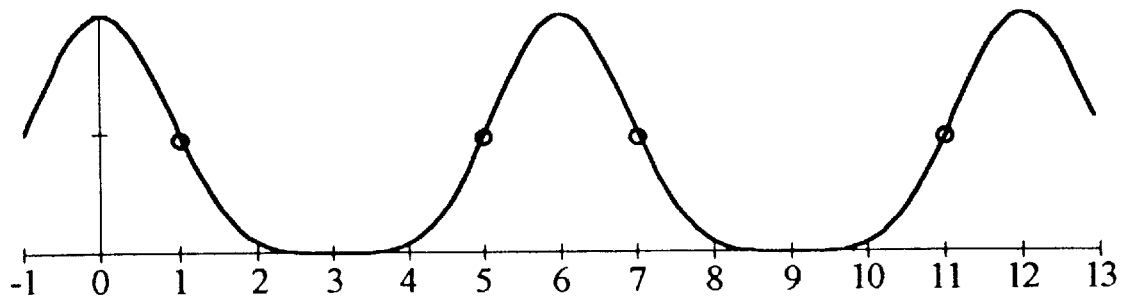
FIG. 13 is a graph of the even component of the analog output of the interferometer of FIG. 1 having a sampling phase of 0 radians, which is marked with sample points that are used to measure the sampling phase deviation from 0 degrees.
Figure 14:
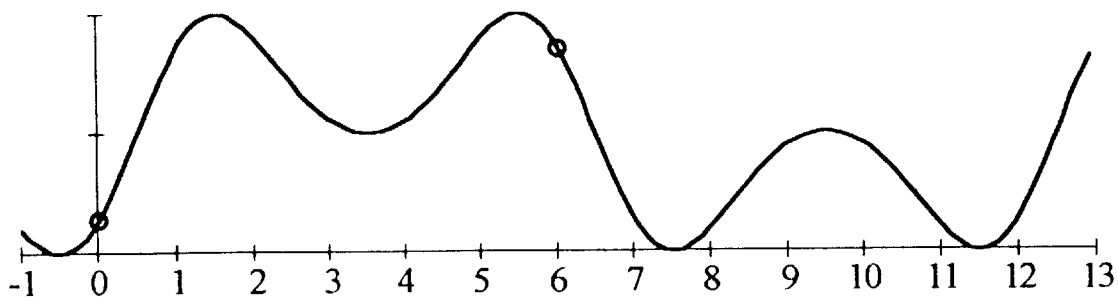
FIG. 14 is a graph of the odd component of the analog output of the interferometer of FIG. 1 having a sampling phase of minus $\pi/12$ radians, which is marked with sample points that are used to measure the sampling phase deviation from 0 radians.
Figure 15:
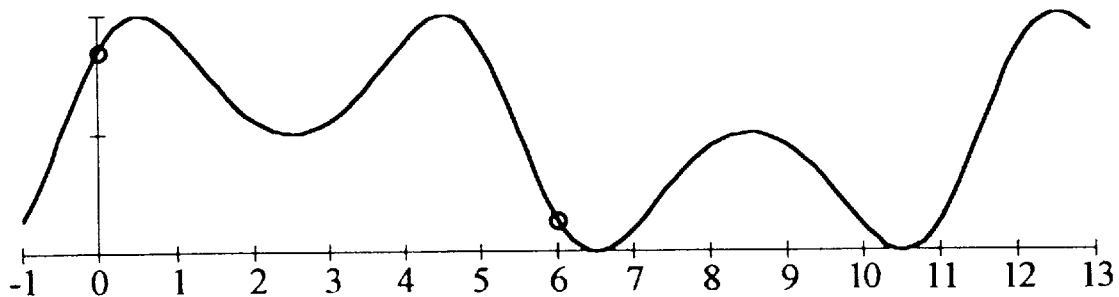
FIG. 15 is a graph of the odd component of the analog output of the interferometer of FIG. 1 having a sampling phase of $\pi/12$ radians, which is marked with sample points that are used to measure the sampling phase deviation from 0 radians.
Figure 16:
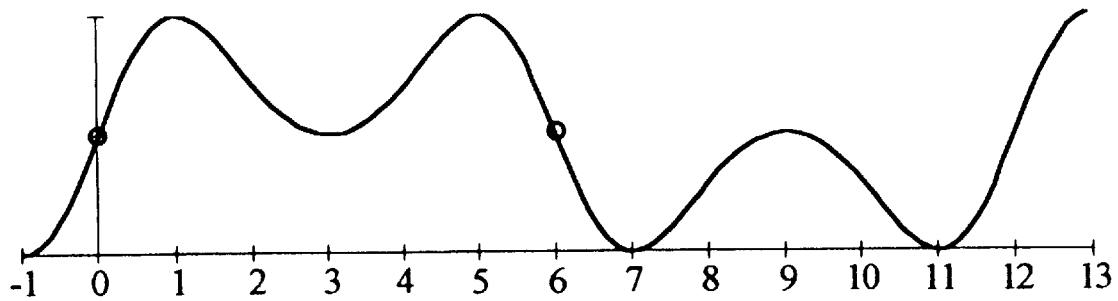
FIG. 16 is a graph of the odd component of the analog output of the interferometer of FIG. 1 having a sampling phase of 0 radians, which is marked with sample points that are used to measure the sampling phase deviation from 0 radians.

FIG. 11 shows the samples of CW on the even modulation function E(t), which has a modulation depth M of $\pi$ and a phase W of $-\pi/12$ radians. The graph shows that (S7+S1)-(S6+S0) measures a positive number. FIG. 12 shows the samples of CW on the even modulation function E(t), which has a modulation depth M of $\pi$ and a phase W of $\pi/12$ radians. The value of CW in this case is clearly negative. FIG. 13 shows the samples of CW on E(t) where M is $\pi$ radians and W is zero, and it is clear that CW is now zero. The measure CW thus forms a sample phase error using the even modulation function with a null operating point when W is 0 radians. The same demonstration is done with SW using the odd modulation function O(t) in FIG. 14 where W is $-\pi/12$, in FIG. 15 where W is $\pi/12$ radians, and FIG. 16 where W is 0 radians. SW is seen to form a sample phase error using the odd modulation function with a null operating point when W is 0 radians.

Therefore the modulation depth error generator 60 forms a number EM from a linear combination of the twelve samples in the buffer 50 during the last modulation cycle. This number from output 92 is proportional to the deviation of the interferometer modulation depth M from $\pi$ radians. The computation of EM depends upon the octant number from output 84 as shown below.

```
0EM = - S0 + S1 - S3 + S5 - S6 + S7 - S9 + S11
1EM = -S3 + S9
2EM = -S3 + S9
3EM = S0 - S1 + S3 - S5 + S6 - S7 + S9 - S11
4EM = S0 - S1 + S3 - S5 + S6 - S7 + S9 - S11
5EM = S3 - S9
6EM = S3 - S9
7EM = - S0 + S1 - S3 + S5 - S6 + S7 - S9 + S11
```

The number from output 92 is transferred to the input of a multiplier 93. A constant number from output 94 of a modulation depth error feedback gain 96 determines the time constant of the correction to the feedback modulation depth MF 102. The multiplier 93 forms the product of the modulation depth error output 92 and the modulation depth error feedback gain output 94. This product from output 98 is transferred to an adder 100. The adder 100 constitutes an integral servo that takes as input the feedback modulation depth 102a from the previous modulation cycle and adds it to the scaled modulation depth error output 98. The new feedback modulation depth output 102 is transferred to another multiplier 104.

The gains of the modulation depth and sample phase error measures can be found by using the orthogonal conditions and evaluating the sums near the null operating point where M is nearly $\pi$ radians and W is near zero. The results are shown below:

$$CM = 2P_{ac}(\pi - M)\cos(R)$$

$$SM = 2P_{ac}(\pi - M)\sin(R)$$

$$CW = 4P_{ac}c\ MW\cos(R)$$

$$SW = 2P_{ac}MW\sin(R)$$

The constant (c) in the expression for CW is equal to $\sqrt{3}/2$. The gains of all the measures depend upon the sine or cosine of the input phase R. As a result, the gain of an error number can fade away and also change sign as the input phase R travels around the unit circle. These problems can be solved by using only the dominant error in the current octant with the proper sign change. The gains will at most be reduced by $\cos(\pi/4)$ or 0.71. The error terms for the sample phase W also have different gains by a factor of 1.73. This adjustment can be made to the feedback gain so that the average contributions from the even and odd sample phase errors are the same. The error term EM for the modulation depth, the error term EW for the sample phase and the sample phase feedback gain constant GW for each octant are shown below.

| 0 | EM = CM  | EW = CW  | GW = GCW |
| 1 | EM = SM  | EW = SW  | GW = GSW |
| 2 | EM = SM  | EW = SW  | GW = GSW |
| 3 | EM = -CM | EW = -CW | GW = GCW |
| 4 | EM = -CM | EW = -CW | GW = GCW |
| 5 | EM = -SM | EW = -SW | GW = GSW |
| 6 | EM = -SM | EW = -SW | GW = GSW |
| 7 | EM = CM  | EW = CW  | GW = GCW |

The average values of the errors EM and EW will be zero when the modulation sine supplied by the invention has the correct amplitude MF and phase WF. The correct values can be maintained under operation by forming null seeking integral servos, which are updated every modulation cycle time TC as follows:

$$MF=MF+GM \cdot EM$$

$$WF=WF+GW \cdot EW$$

The time constants of these two servos will depend upon the values of the feedback gains GM and GW multiplied by the gains of EM and EW. The feedback gains should be set to provide sufficient averaging of the noise and good response to changes in the modulation depth of the interferometer M and sample phase of the interferometer W. The feedback gains for the even and odd functions in terms of the modulation depth time constant TM and the sample phase time constant TW where both are in modulation cycles are:

$$GCM=1/(2P_{ac}TM|\cos R|)$$

$$GCW=1/(2c2\pi P_{ac}TW|\cos R|)$$

$$GSM=1/(2P_{ac}TM|\sin R|)$$

$$GSW=1/(2\pi P_{ac}TW|\sin R|)$$

The dependence upon the input phase R can be removed by choosing the maximum time constant in the octant of operation where cosR=sinR=1 giving:

$$GM=GCM=GSM=1/(2P_{ac}TM)$$

$$GSW=1/(2\pi P_{ac}TW)$$

$$GCW=GSW/2c$$

The initial values of MF and WF must be chosen to insure proper convergence to the optimum operating values. Fortunately, the sampling phase is generally insensitive to environment so does not change appreciably from turn on to turn on and can recover from an initial error of ±π/12 radians. The initial modulation depth can change from turn on to turn on in many applications but the servo can recover from a large initial error.

The sample phase error generator 62 forms a number EW from a linear combination of the twelve samples in the buffer 50 during the last modulation cycle. This number from output 106 is proportional to the deviation of the sample phase W of the interferometer 32 from the optimum operating point. The computation of EW depends upon the octant output 84 as shown below.

| 0 | EW = S1 − S5 + S7 − S11 |
| 1 | EW = S0 − S6 |
| 2 | EW = S0 − S6 |
| 3 | EW = −S1 + S5 − S7 + S11 |
| 4 | EW = −S1 + S5 − S7 + S11 |
| 5 | EW = −S0 + S6 |
| 6 | EW = −S0 + S6 |
| 7 | EW = S1 − S5 + S7 − S11 |

The number from output 106 is transferred to the input of a multiplier 108. The number GW from output 114 of the sample phase error feedback gain 86 is a number selected from two constants named GCW and GSW by the input number from the octant output 84. This number from output 114 determines the time constant of the correction to the feedback sample phase WF 120. The octant determines the value of GW as follows:

| 0 | GW = GCW |
| 1 | GW = GSW |
| 2 | GW = GSW |
| 3 | GW = GCW |
| 4 | GW = GCW |
| 5 | GW = GSW |
| 6 | GW = GSW |
| 7 | GW = GCW |

The number from output 114 is transferred to the multiplier 108. The multiplier 108 forms the product of the sample phase error output 106 and the sample phase error feedback gain output 114. This product from output 116 is transferred to an adder 118. The adder 118 constitutes an integral servo, which takes as input the feedback sample phase 120a, from the previous modulation cycle and adds it to the scaled sample phase error 116. The new feedback modulation depth 120 is transferred to a sine generator 122.

The output 124 from the clock 42 is the sine generator update clock that triggers the sine generator 122 to compute a new value for output 126. The sine generator clock signal 124 has the same rate as the ADC sample clock 44 so there are twelve steps in the analog output 132 labeled d(t) of the digital to -analog converter 130 during one modulation cycle. The number from output 126 of the sine generator 122 is formed from the current feedback phase 120 and the current step of the sine generator update clock signal 124. The sine generator update clock triggers the addition of π/6 radians to a radian time accumulator t. Therefore, the number from output 126 is:

$$\sin(WF+t)$$

The number from output 126 is transferred to the multiplier 104 after each sine generator update clock signal 124, which will happen twelve times every modulation cycle.

The number from output 128 of the multiplier 104 is formed from the product of the current sine value 126 and the feedback modulation depth 102. Therefore the number from output 128 is:

$$MF \cdot \sin(WF+t)$$

This is transferred to a digital to analog converter 130 (D to A). The analog output 132 of the digital to analog converter 130 is a sine synthesized from twelve analog steps (shown in FIG. 17), which is input to a lowpass filter 134. The filter 134 passes the fundamental of the analog input {d(t)} as the pure sine wave output 34 {D(t)} (shown in FIG. 18).

In the preferred embodiment of the invention shown in FIG. 1, the components of the block diagram can be fabricated from a combination of hardware and programmable elements. One implementation is to make the components enclosed by dashed line, instructions of a digital signal processor 38. The instructions of the digital signal processor 38 would implement sixteen bit fixed point math with a thirty two bit accumulator. In that case, the demodulated output phase DR from output 40 is a thirty two bit signed integer where the lowest twenty bits represent the unsigned output phase H from output 88. The upper twelve bits of DR represent the signed fringe integer. This format gives a scale factor of $2^{20}$ bits per 2π radians or six microradians per bit and a range of plus or minus 12,868 radians. As should be obvious from the discussion above, many other embodiments are possible, making the invention adaptable to many applications.

Figure 19:
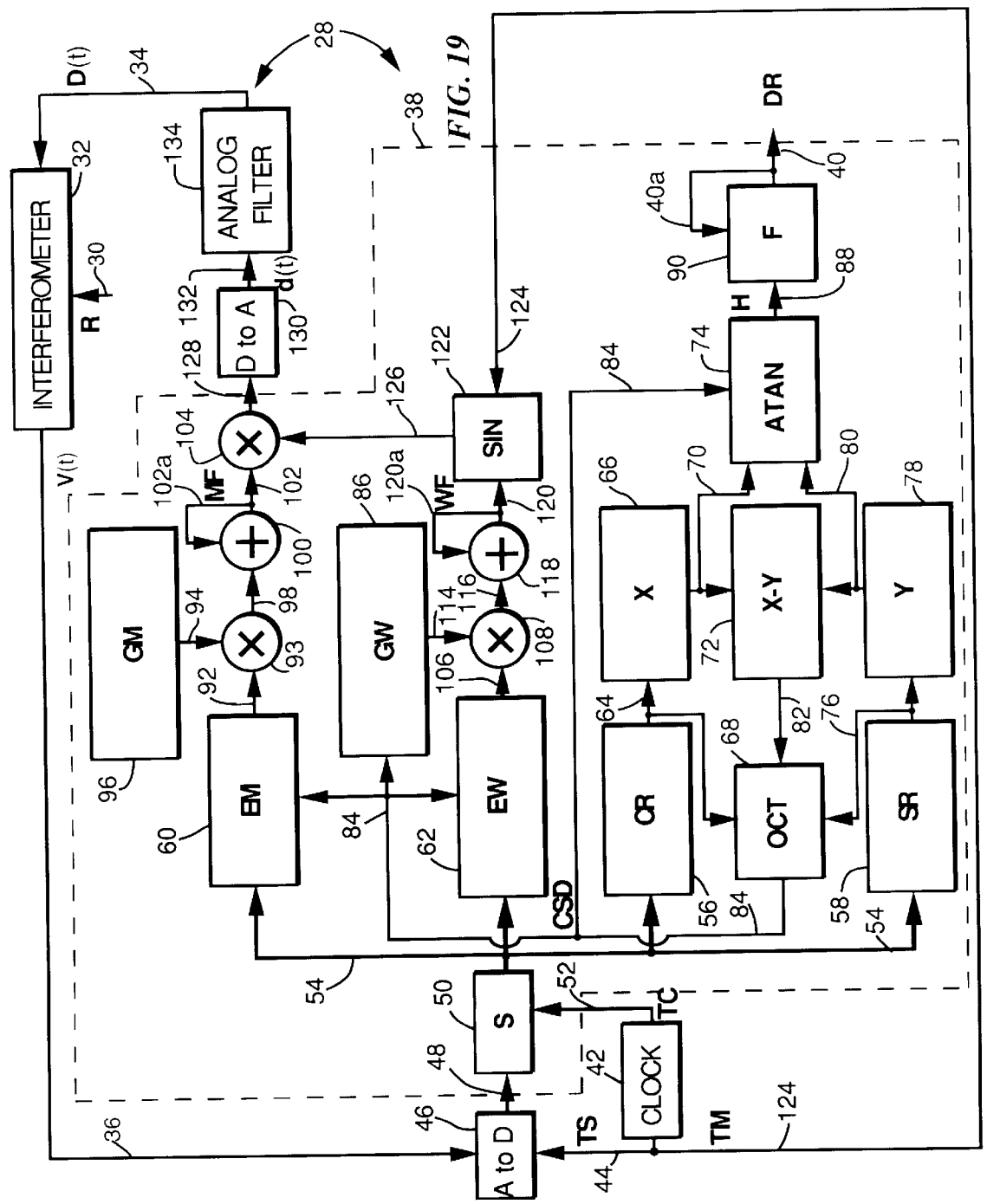
FIG. 19 is the schematic block diagram of FIG. 1 with the labels applied thereto that are used in the software embodiment of the invention.

The following is a listing of typical computation steps to be performed by the digital signal processor 38 to demodulate the input phase 30 with FIG. 19 being a copy of FIG. 1 with the listing names identified with the components of FIG. 1.

The analog to digital converter samples from output 48 are unsigned integers. The digital signal processor program starts with the occurrence of the modulation cycle clock TC from output 52, which signals that twelve samples have been transferred from the sample buffer 50. First, the addresses O0, O1, O2, O3, O4, O5, O6 and O7 of processor instruction groups are assigned to elements of the array OCT which is indexed by the octant number, which is named CSD. The integer computations are performed as shown below and the program transfers to the instruction group for the resulting octant. To demodulate the samples and branch to the current octant:

```
OCT(0) = O0
OCT(1) = O1
OCT(2) = O7
OCT(3) = O6
OCT(4) = O3
OCT(5) = O2
OCT(6) = O4
OCT(7) = O5
SR = S7+S11−S5−S1
Y = abs(SR)
CR = S0−S3+S6−S9
X = abs(CR)
D = X − Y
CSD = D·2⁻¹⁵ + (SR·2⁻¹⁴ and 2) + (CR·2⁻¹³ and 4)
JUMP OCT(CSD)
```

Figure 17:
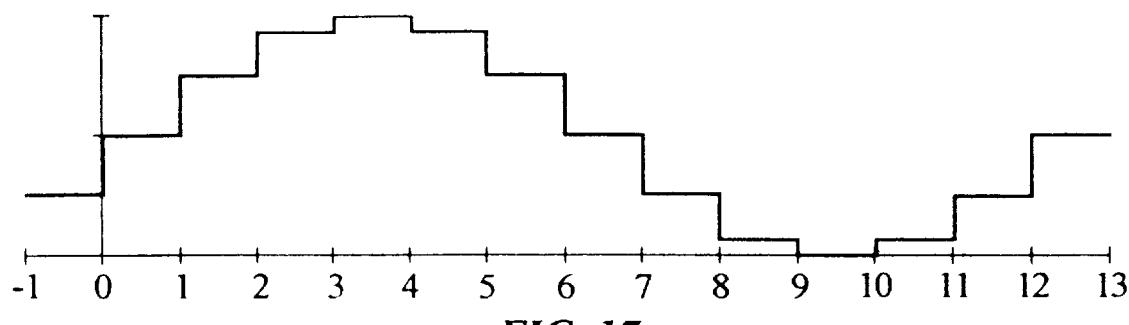
FIG. 17 is a graph of a digitally synthesized modulation sine is used to generate the modulation sine.

The octant instruction groups each implement the function of blocks 60, 62, 74, 93, 96, 86, 108, 100 and 118 of FIGS. 1 and 17 for the appropriate octant. The computation steps for each of the eight octants are:

```
O0:    H = ATAN(X,Y)
       EM = −S0+S1−S3+S5−S6+S7−S9+S11
       MF = GM·EM+MF
       EW = S1−S5+S7−S11
       WF = GCW·EW+WF
O1:    H = 4·2¹⁶−ACOT(X,Y)
       EM = −S3+S9
       MF = GM·EM+MF
       EW = S0−S6
       WF = GSW·EW+WF
O2:    H = 4·2¹⁶−ACOT(X,Y)
       EM = −S3+S9
       MF = GM·EM+MF
       EW = S0−S6
       WF = GSW·EW+WF
O3:    H = 8·2¹⁶−ATAN(X,Y)
       EM = S0−S1+S3−S5+S6−S7+S9−S11
       MF = GM·EM+MF
       EW = −S0−S1+S5−S7+S11
       WF = GCW·EW+WF
O4:    H = 8·2¹⁶+ATAN(X,Y)
       EM = S0−S1+S3−S5+S6−S7+S9−S11
       MF = GM·EM+MF
       EW = −S1+S5−S7+S11
       WT = GCW·EW+WF
O5:    H = 12·2¹⁶−ACOT(X,Y)
       EM = S3−S9
       MF = GM·EM+MF
       EW = −S0+S6
       WF = GSW·EW+WF
O6:    H = 12·2¹⁶−ACOT(X,Y)
       EM = S3−S9
       MF = GM·EM+MF
       EW = −S0+S6
       WF = GSW·EW+WF
O7:    H = 16·2¹⁶−ATAN(X,Y)
       EM = −S0+S1−S3+S5−S6+S7−S9+S11
       MF = GM·EM+MF
       EW = S1−S5+S7−S11
       WF = GCW·EW+WF
```

The feedback modulation depth MF and the feedback phase of the modulation WF are thirty two bit unsigned integers. The thirty two bits of the feedback phase of the modulation WF spans $2\pi$. The inverse tangent block 74 has been implemented as calls to either an inverse tangent subroutine ATAN(X,Y) or an inverse cotangent subroutine ACOT(X,Y) as determined by the octant number. The computation steps to find the inverse tangent or inverse cotangent if in the first octant are:

```
ATAN(X,Y):
    if {27146·X−Y·2¹⁶} >= 0 then
        B1 = {2Y}2¹⁶/X
        return(GETZ(B1))
    else
        B1 = (X·2¹⁶−Y·2¹⁶)·2/(X+Y)
        return(2¹⁷−GETZ(B1))
ACOT(X,Y):
    if {27146·Y−X·2¹⁶} >= 0 then
        B1 = {2X}2¹⁶/Y
        return(GETZ(B1))
    else
        B1 = (Y·2¹⁶−X·2¹⁶)·2/(X+Y)
        return(2¹⁷−GETZ(B1))
```

The inverse tangent and cotangent subroutines call in turn the series evaluation subroutine GETZ (B1).

```
A0 = 41721
A3 = 55629
B5 = 8344
B7 = 1490
B9 = 290
B11 = 59
GETZ(B1):

B2 = B1·B1·2⁻¹⁶
D4 = B9−B2·B11·2⁻¹⁶
D3 = B7−B2·D4·2⁻¹⁶
D2 = B5−B2·D3·2⁻¹⁶
D1 = A3−B2·D2·2⁻¹⁶
D0 = B2·D1·2⁻¹⁶
return {{(−B1·D0·2⁻⁴+A0·B1)2+B1}2⁻¹⁶+1}
```

The fringe instruction group, which adds the fringe to the $2\pi$ output phase, implements block 90, and results in the thirty two bit signed demodulated output phase DR is:

```
HR = DR and 0FFFFFh
FRINGE = DR and 0FFF00000h
    if H >= HR then
        if H−HR > 2¹⁹ then
            DR = FRINGE−2²⁰+H
        else
            DR = FRINGE+H
    else
        if HR−H > 2¹⁹ then
            DR = FRINGE+2²⁰+H
        else
            DR = FRINGE+H
```

Figure 18:
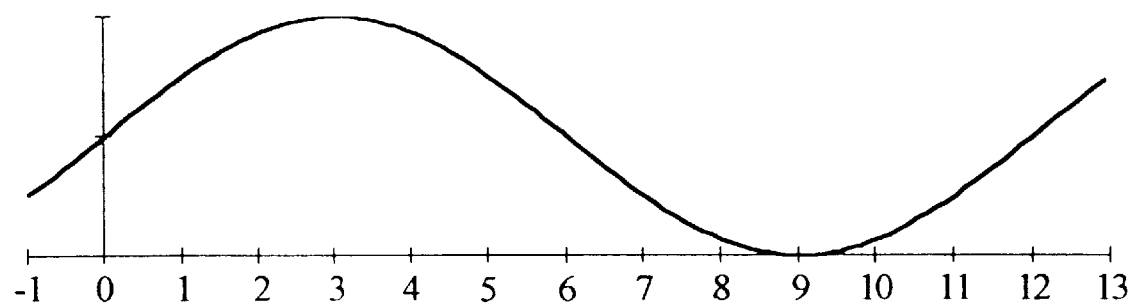
FIG. 18 is a graph of a modulation sine that drives the interferometer of FIG. 1.

The sine generator 122 updates its output value 126 and causes a new D to A input 128 to be presented to the digital to analog converter 130 at every occurrence of the clock output 124 labeled TM. The sine generator 122 uses two tables that are initialized before the demodulation starts. The first:

$$K(J)=J\cdot 65536/12$$

shown as the table K, which holds the twelve unsigned phase update points so that the index J goes from zero to eleven. The second is the sine table U $$U(I)=32767\cdot\sin(I\cdot 2\pi/1024)+32768$$

which has 1024 entries so that the index I goes from 0 to 1023. The size of the tables can be changed in other embodiments and will work in the same manner. The counter STEP will increment by one for every occurrence of the clock TM and roll back to a value of zero when it reaches twelve. A sixteen bit unsigned index IND $$IND=(K(STEP)+WF\cdot 2^{-16}) \text{ and OFFFFh}$$

is computed from the current value of STEP and the current feedback phase of the modulation WF. The index is computed modulo 65536. The D to A output $$D\text{ to }A=\{MF\cdot 2^{-16}\cdot U(IND\cdot 2^{-6})-MF\cdot 2^{-1}\ 32767\cdot 2^{16}\}2^{-16}$$

is computed from highest ten bits of the index IND and the current unsigned 32 bit feedback modulation depth MF. The highest 12 bits of D to A are used. The analog output 132 generated by the D to A values is shown in FIG. 17. The analog output 34 of the lowpass filter 134 is shown in FIG. 18.

The above description and theory of operation should not be construed as limiting the scope of the invention. Many other embodiments are possible that maintain the essence of orthogonal demodulation. An important variant is to eliminate the generation of the sine modulation and therefore computation of the error terms EM and EW. This may need to be done in time domain multiplexed sensors systems where an external sine dither of a common source wavelength provides the phase modulation for all the sensors. In this case, the modulation depth and phase of the modulation would be different for each sensor. The computation of the input phase R for a particular sensor would follow the same procedure as outlined except that a gain balance G for that sensor would be added. The gain balance would modify the magnitude components as shown below:

$$X=(1-G)\cdot|CR|$$

$$Y=G\cdot|SR|$$

The gain balance constant G would be calibrated to correct for the scale factor difference between X and Y due to non optimum values of the modulation depth M and phase of modulation W. Another variation along this line would be to change the samples from twelve per modulation cycle to six. This can be done as long as the modulation sine is not to be controlled by the error terms EM and EW. An example of sample pairs that work for six samples per modulation cycle where there are $\pi/3$ radians between samples are given below:

$$CR=(S3+S0)-(S4+S1)$$

$$SR=(S3-S0)+(S5-S2)$$

The samples per modulation cycle can be any number as long as the orthogonal conditions are met.

The design parameters of the orthogonal demodulation system are also flexible. The time interval TM that strobes the sine generator update can as well be any number instead of the stated twelve per modulation cycle. A higher number would obviously lessen the requirements on the following lowpass filter and a lower number would decrease the computations. The defined number of bits of the computation variables can be changed as well without changing the underlying approach. A floating point digital signal processor could be used. More terms added to the inverse tangent series would improve the resolution and more bits in the fringe counter would increase the dynamic range.

The hardware implementation is also flexible. A low cost digital signal processor would provide a simple system but replacing components with hardware equivalents would increase the maximum operation speed. The fastest implementation may be the design of a complete application specific integrated circuit that would include the analog components as well.

In review, a device is present in the interferometer that introduces a phase shift at a constant frequency resulting in an analog output of:

$$V(t)=P_{dc}+P_{ac}\cos\{R+M\sin(t+W)\}$$

where M is the modulation depth of the interferometer, W is the phase of the modulation of the interferometer and t is the linearly increasing time in units of radians. The modulation phase defined by the term:

$$M\sin(t+W)$$

in the cosine argument is the result of a single frequency sinusoidal drive output applied to the interferometer.

Figure 20B:
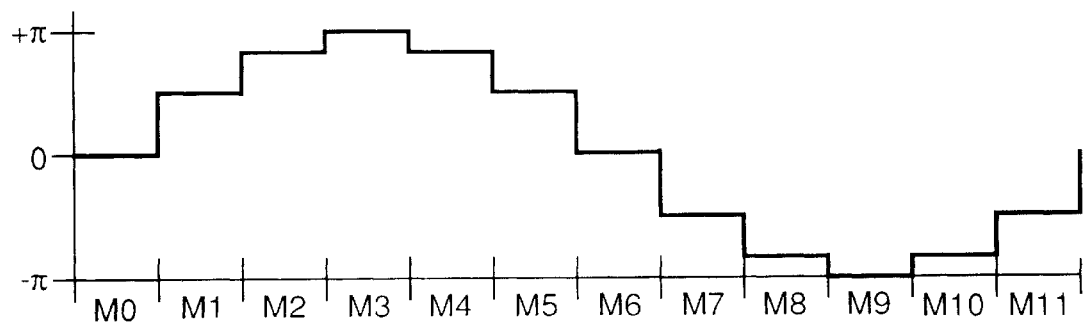
FIG. 20B is a graph of stepped modulation of FIG. 20A.
Figure 21A:
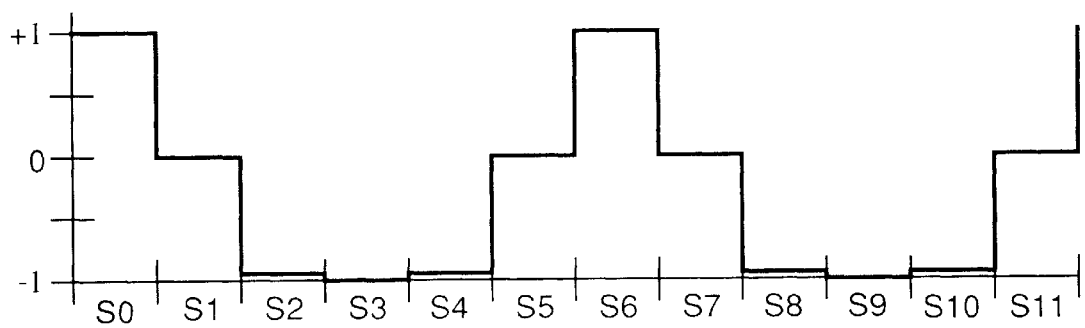
FIG. 21A is a graph of a typical resultant signal from an interferometer at 0 radians phase fed the signal of FIG. 20.
Figure 21B:
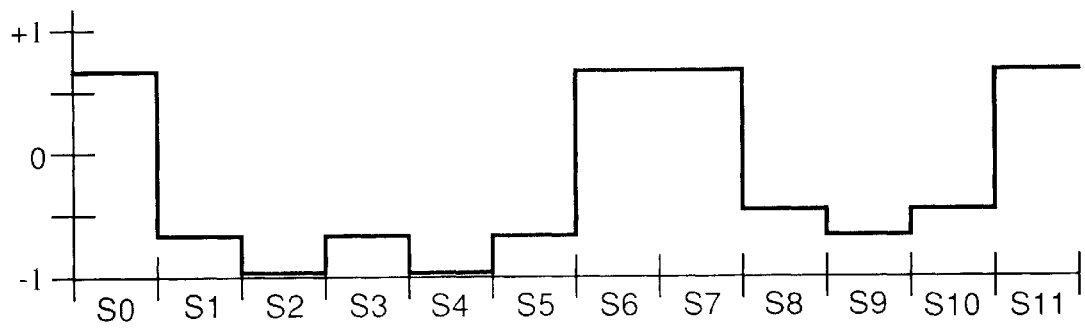
FIG. 21B is a graph of a typical resultant signal from an interferometer at $\pi/4$ radians phase fed the signal of FIG. 20.
Figure 21C:
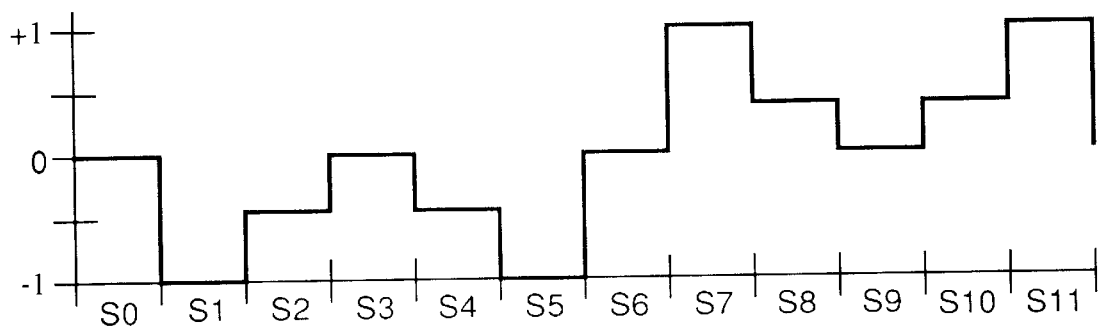
FIG. 21C is a graph of a typical resultant signal from an interferometer at $\pi/2$ radians phase fed the signal of FIG. 20.
Figure 21D:
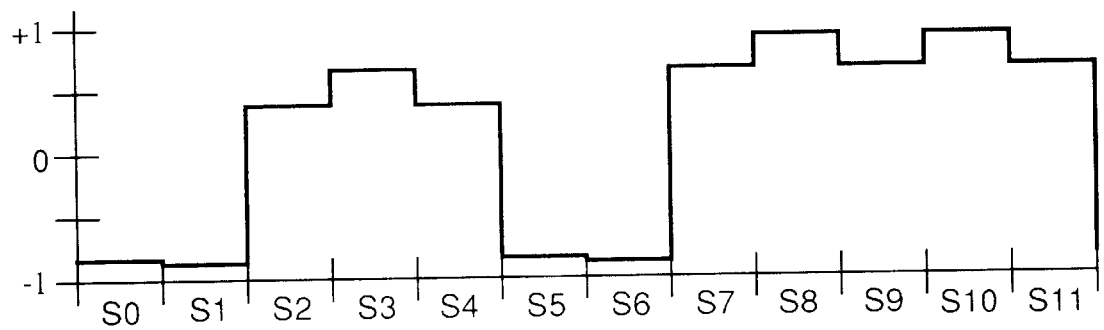
FIG. 21D is a graph of a typical resultant signal from an interferometer at $3\pi/4$ radians phase fed the signal of FIG. 20.
Figure 21E:
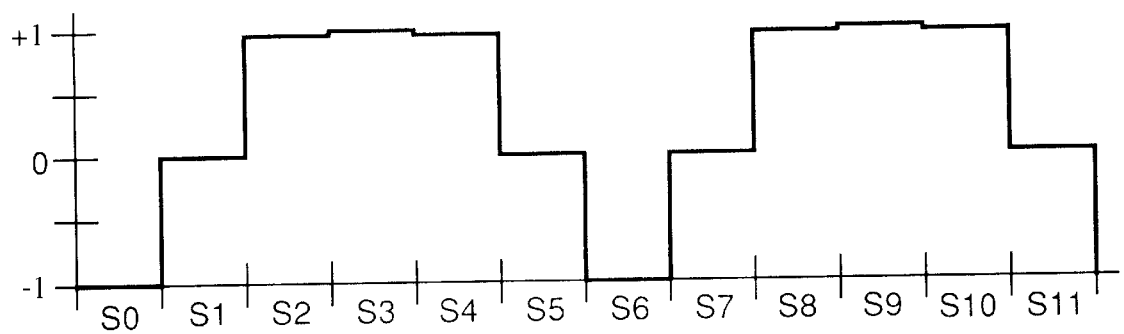
FIG. 21E is a graph of a typical resultant signal from an interferometer at $\pi$ radians phase fed the signal of FIG. 20.
Figure 21F:
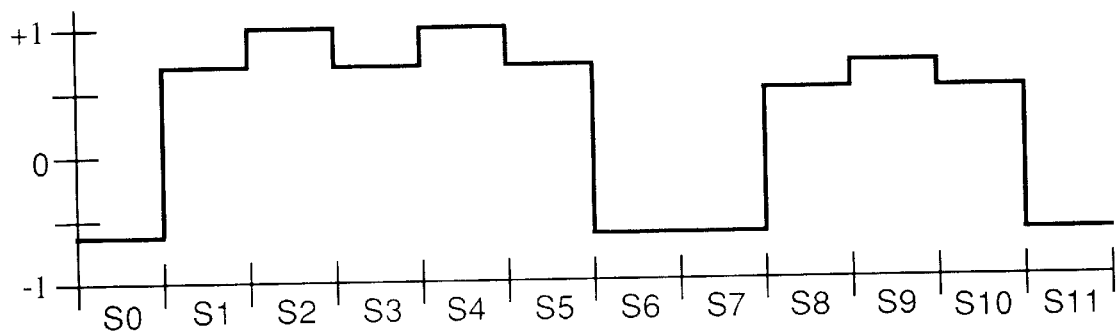
FIG. 21F is a graph of a typical resultant signal from an interferometer at $5\pi/4$ radians phase fed the signal of FIG. 20.
Figure 21G:
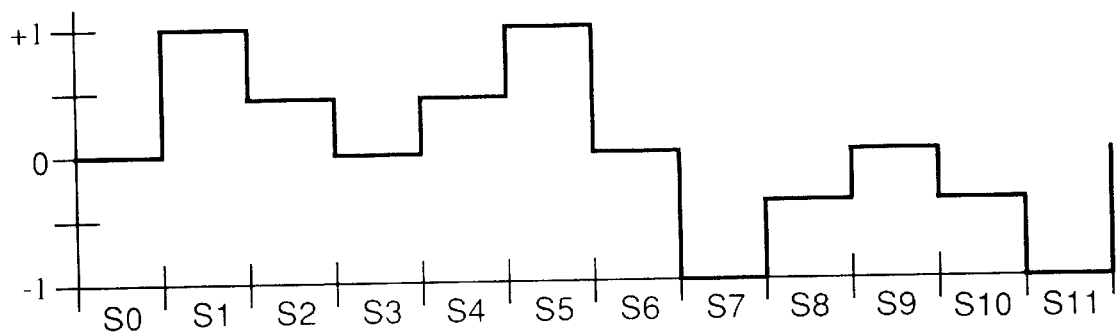
FIG. 21G is a graph of a typical resultant signal from an interferometer at $3\pi/2$ radians phase fed the signal of FIG. 20.
Figure 21H:
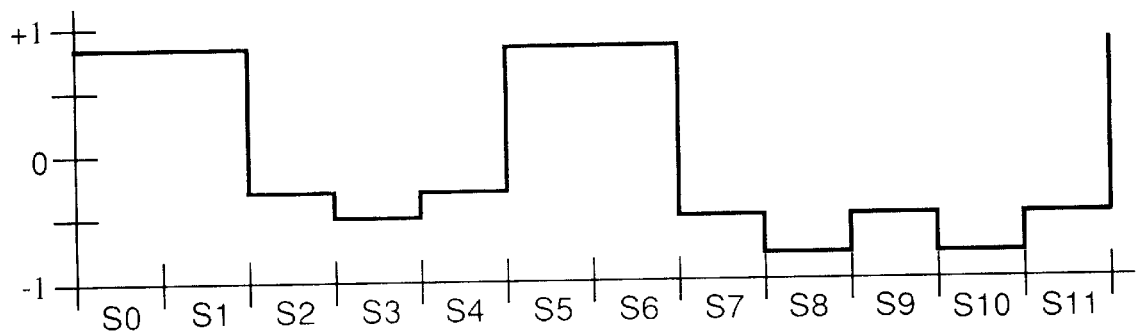
FIG. 21H is a graph of a typical resultant signal from an interferometer at $7\pi/4$ radians phase fed the signal of FIG. 20.

Previously, the modulation has been described as sinusoidal. However, since the method of demodulating includes digitizing the signals which come from the optical receiver, there is no requirement to modulate the interferometer with a sinusoidal signal, but rather from system 28', shown in FIG. 19A, a signal with twelve or less discreet steps, as shown in FIG. 20, which represent the phase modulation levels, relative to when the sampling is taken. The system 28' is modified by substituting a step generator 136 for the sine generator 122 to generate phase inputs stepped at intervals along a sine wave, an analog gain 138 for the analog filter 134 to maintain a proper signal level, and eliminating the phase error generating inputs, since they are not needed for a phase stepped system 28'. The twelve modulation levels, M0 to M11, which pertain directly to the twelve sample signals SO to S11 as shown in FIG. 21, such that M0 leads to S0, M1 leads to S1, M2 leads to S2, and so on. M1 to M11 take on values with the preferred modulation depth of $\pi$ radians using $M\sin(t+W)$, so that:

| | |
|---|---|
| M0 = 0 | S0 Used by Demod. Algorithm |
| M1 = $+\pi/2$ | S1 Used by Demod. Algorithm |
| M2 = $+0.866\pi$ | S2 Not Used |
| M3 = $+\pi$ | S3 Used by Demod. Algorithm |
| M4 = $+0.866\pi$ | S4 Not Used |
| M5 = $+\pi/2$ | S5 Used by Demod. Algorithm, redundant to M1 & S1 |
| M6 = 0 | S6 Used by Demod. Algorithm, redundant to M0 & S0 |
| M7 = $-\pi/2$ | S7 Used by Demod. Algorithm |
| M8 = $-0.866\pi$ | S8 Not Used |
| M9 = $-\pi$ | S9 Used by Demod. Algorithm |
| M10 = $-0.866\pi$ | S10 Not Used |
| M11 = $-\pi/2$ | S11 Used by Demod. Algorithm, redundant to M7 & S7 |

What the above relationships show are that of the twelve samples present, only eight of them are used to perform the demodulation and check for modulation depth and phase errors. Even though not needed, the twelve samples are measured in the analog to digital converter 46 anyway, as it is very convenient to run an analog to digital converter at a fixed sample rate and that when doing so, S2, S4, S8, and S10 are merely discarded. Also, of the eight signals (and corresponding modulation levels) used to perform the demodulation, three of them are redundant namely M5 and S5 are redundant to M1 and S3, M6 and S6 are redundant to M0 and S0, and M11 and S11 are redundant to M7 and S7.

Again, it is convenient to measure S5, S6, and S11, in that these signals are created by virtue of the sinusoidal modulation. If they were not measured, the system signal-to-noise would degrade slightly, but other than that, whether they are measured or not doesn't matter.

Taking a closer look, at these relationships and going with the idea that a cycle of sinusoidal modulation is not used, but instead discreet levels of modulation along a sinusoid, only five modulation levels and sampled signals are needed to perform the demodulation process, while retaining the same benefits and accuracy of the sine wave modulation approach.

By recognizing the redundancy of S5, S6, and S11, and using the substitution $$S6=S0$$
$$S5=S1$$
$$S11=S7$$

the equations $$CR=S6+S0-S9-S3$$
$$SR=S7-S1+11-S5$$

become:

$$CR=2S0-S3-S9$$
$$SR=2(S7-S1)$$

The five sample approach has the same inherent ability to correct for itself, and the "pick-off" terms for monitoring the modulation depth can also be used with the substitutions for S5, S6, and S11 so that the equations $$CM=S7+S1-S6-S0+S11+S5-S9-S3$$
$$SM=S9-S3$$

now become $$CM=2S1+2S7-2S0-S3-S9$$
$$SM=S9-S3 \text{ (no change)}$$

When the sinusoidal modulation is dropped and the discreet modulation levels are used, the terms CW and SW, for calculating sample phase offsets have no meaning and aren't used.

Figure 22:
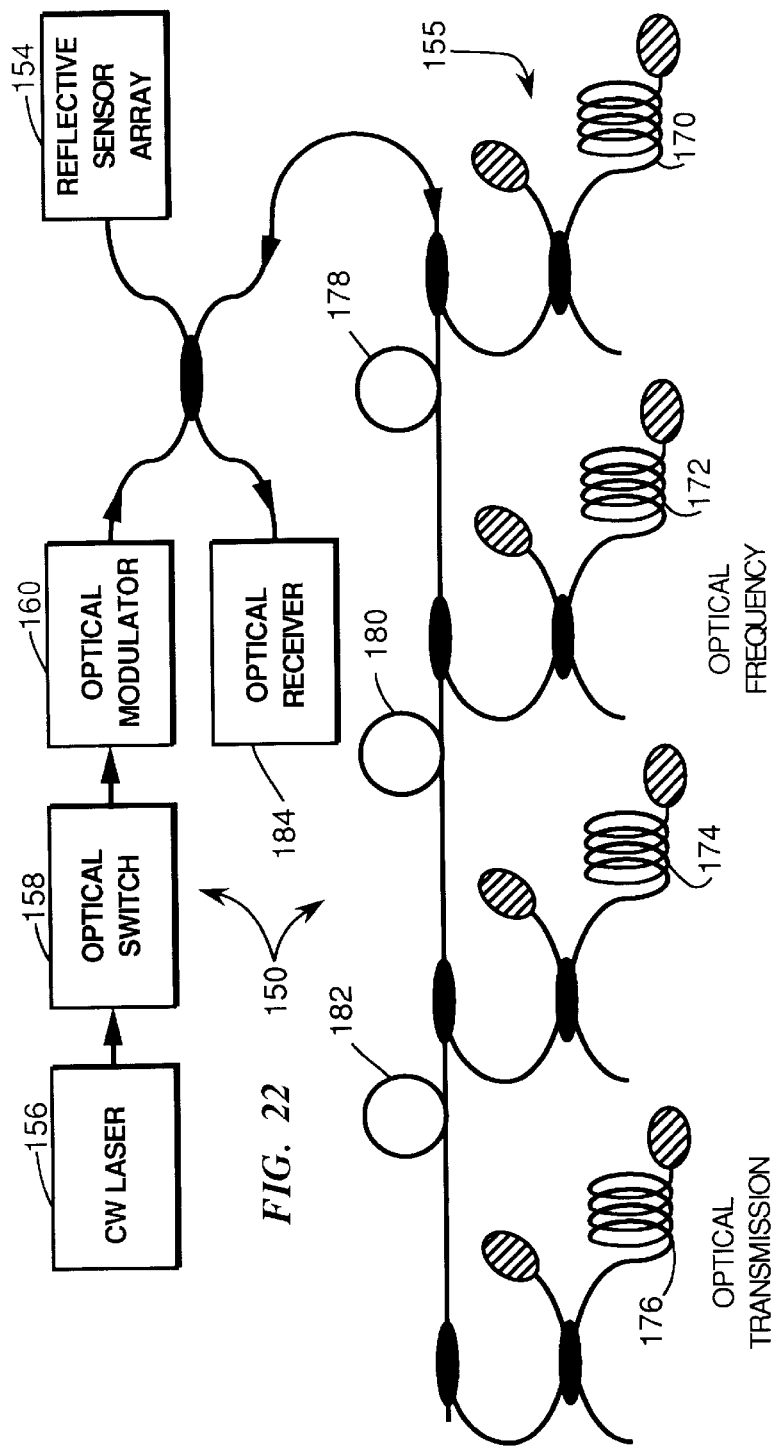
FIG. 22 is a schematic block diagram of a sensor system having reflective sensor arrays.
Figure 23:
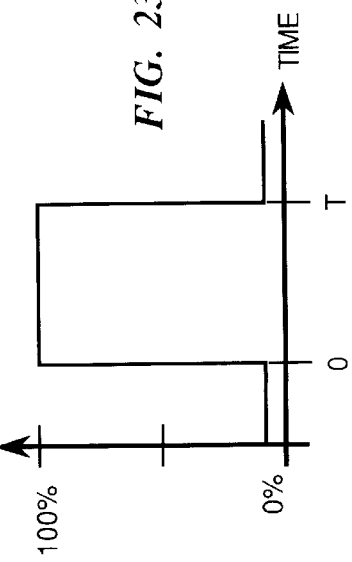
FIG. 23 is a graph of the operation of the optical switch of FIG. 22.
Figure 24:
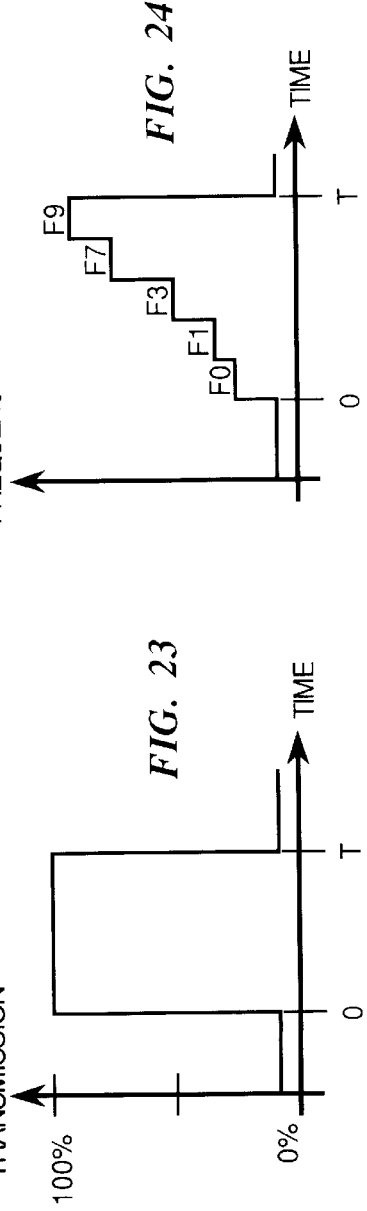
FIG. 24 is a graph of the output of the optical modulator of FIG. 22.
Figures 25, 26:
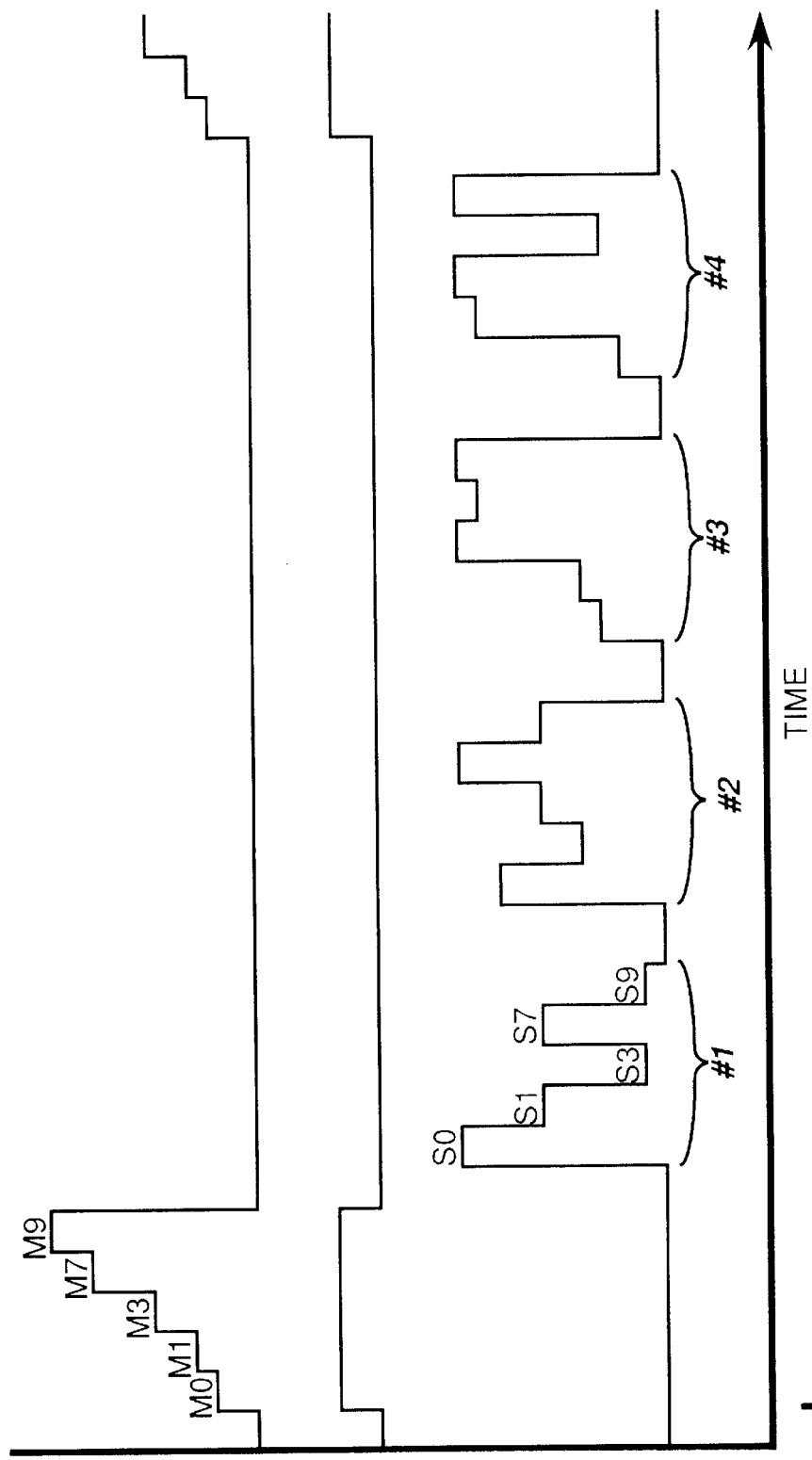
FIG. 25 is a timing diagram for a single array system, similar to FIG. 22.
FIG. 26 is a graph of possible modulation that has a scrambled order.

FIG. 22 shows a sensor system 150. If the modulator 152 is external to the interferometer(s) (shown as sensor arrays 154 and 155), then the modulator 152 needs to be an optical frequency modulator. The system 150 is shown having a OW laser 156 as the light source whose light is passed or blocked by an optical switch 158 to produce the signal shown in FIG. 23 before being modulated as shown in FIG. 24. The output of the optical modulator 152 is sent down a fiber 160 and split by a fiber coupler 162. Each of the output legs 164 and coupler 162 coupler 162 are shown connected to a reflective sensor array. As shown with array 155, four sensors 170, 172, 174, and 176 are connected in series with delay lines 178, 180, and 182 there between to provide sufficient optical length for signal separation when physical separation is not far enough. The array 154 can have a similar configuration, but the optical spacing of the sensors therein must be different from that of sensors 170, 172, 174, and 176. Assuming for the moment that array 154 is not present, FIG. 25 shows the time relationship between the five needed modulation steps M0, M1, M3, M7, and M9 out of the modulator 152 and the four signals that come back to the optical receiver 184 for demodulation. Without proper optical spacing, the four signals would overlap. Note from FIG. 20 and FIG. 26 that the modulation does not have to start at a particular point nor does the modulation have to be in any order, so long as the order is known.

Although the phase modulation levels M0, M1, M3, M7 and M9 can be applied in any order, there is a preferred order that minimizes the distortion of the measurement of the input phase R. That this is so can be understood by examining the demodulated values of CR and SR which have the values given below as shown previously.

$$CR=2S0(t0)-S3(t3)-S9(t9)=4P_{ac}\cos\{R(tc)\}$$

$$SR=2\{S7(t7)-S1(t1)\}=4P_{ac}\sin\{R(ts)\}$$

The samples S are shown being acquired at a time t by the notation S(t) and the input phase R is shown being effectively measured at times tc for CR and ts for SR. It is a fact that for certain sample orders in time, tc is not equal to ts and the taking the inverse tangent from CR and SR will generate distortion since the numerator and denominator are functions of measurements of the input phase R at slightly different times. This can best be demonstrated by an example. Assume that the samples are evenly spaced in time and acquired in the order S7, S1, S9, S0 and S3. The time at which the sample is taken will increase by one unit for every subsequent sample in the sequence. The multiplier in the formulas for CR and SR will weight this time. The average time for CR and SR will be the sum of these weighted times with the implicit assumption that the input phase R is nearly linear over the time interval containing all the samples. The result is shown in the table below.

| Sample time | sample | CR weight | Contribution to tc | SR weight | Contribution to ts |
|---|---|---|---|---|---|
| 0 | S7 | 0 | 0*0=0 | 2 | 0*2=0 |
| 1 | S1 | 0 | 1*0=0 | 2 | 1*2=2 |
| 2 | S9 | 1 | 2*1=2 | 0 | 2*0=0 |
| 3 | S0 | 2 | 3*2=6 | 0 | 3*0=0 |
| 4 | S3 | 1 | 4*1=4 | 0 | 4*0=0 |
| total | | | 12 | | 2 |

The average time tc for the cosine of the input phase is equal to 12 while the average time ts for the sine of the input phase is equal to 2. The time difference of 10 will cause distortion in the inverse tangent when the input phase R is changing appreciably within the time interval during which all the samples are acquired.

Part of the current invention is the recognition that samples of the interferometer output should be acquired in preferred sequences and that these sequences will minimize distortion of the measurement of the input phase R. For samples equally spaced in time, the preferred acquisition sequences for the discreet modulation levels M0, M1, M3, M7 and M9 are given below.

| Sequence 1: | S9 | S7 | S0 | S1 | S3 |
| --- | --- | --- | --- | --- | --- |
| Sequence 2: | S9 | S1 | S0 | S7 | S3 |
| Sequence 3: | S7 | S9 | S0 | S3 | S1 |
| Sequence 4: | S7 | S3 | S0 | S9 | S1 |

The sample time is assumed to increase from left to right but the reverse order will work as well where the sample time decreases from left to right. All these sequences will assure that tc is equal to ts when the cosine of R and the sine of R are linearized over the total sampling time. This fact, for the first sequence, is demonstrated below.

| Sample time | sample | CR weight | Contribution to tc | SR weight | Contribution to ts |
| --- | --- | --- | --- | --- | --- |
| 0 | S9 | 1 | 0*1=0 | 0 | 0*0=0 |
| 1 | S7 | 0 | 1*0=0 | 2 | 1*2=2 |
| 2 | S0 | 2 | 2*2=4 | 0 | 2*0=0 |
| 3 | S1 | 0 | 3*0=0 | 2 | 3*2=6 |
| 4 | S3 | 1 | 4*1=4 | 0 | 4*0=0 |
| total | | | 8 | | 8 |

The second sequence swaps S1 and S7, which will clearly give the same result as for the first sequence. The third sequence is demonstrated below.

| Sample time | sample | CR weight | Contribution to tc | SR weight | Contribution to ts |
| --- | --- | --- | --- | --- | --- |
| 0 | S7 | 0 | 0*1=0 | 2 | 0*2=0 |
| 1 | S9 | 1 | 1*1=1 | 0 | 1*2=2 |
| 2 | S0 | 2 | 2*2=4 | 0 | 2*0=0 |
| 3 | S3 | 1 | 3*1=3 | 0 | 3*0=0 |
| 4 | S1 | 0 | 4*0=0 | 2 | 4*2=8 |
| total | | | 8 | | 8 |

The fourth sequence swaps S3 with S9 and clearly gives the same result as for the third sequence.

Sequences 1 and 2 perform exactly the same in terms of amount of distortion in the demodulation process. However, the distortion is greater for the sequences 3 and 4. This is true if the input phase is nonlinear within the time that the samples are acquired. Sequences 1 and 2 contribute to the measurement of CR and SR in the following time order:

CR SR CR SR CR

Sequences 3 and 4 contribute to the measurement of CR and SR in the following time order:

SR CR CR CR SR

Sequences 1 and 2 interleave in time the measures of CR and SR and so return nearly the same value for a nonlinear input phase. Sequences 3 and 4 measure SR at the ends of the sampling interval and measure CR in the middle of the sampling interval and so amplify nonlinear changes in the input phase. Thus, sequences 1 and 2 are preferred over sequences 3 and 4 when distortion is to be minimized.

There is another embodiment of the present invention that further reduces the amount of distortion from nonlinear changes in the input phase over the sampling time interval. Modulation level M5 was shown to be equal to modulation level M3 and therefore was replaced by the sample at modulation level M3. If this is not done, six samples are then acquired at modulation levels M0, M1, M3, M5, M7 and M9. The original equations for the twelve modulation levels:

$CR=S6+S0-S9-S3$ $SR=S7-S1+S11-S5$

Become for the six modulation levels:

$CR=2S0-S9-S3$ $SR=2S7-S1 S5$

These expressions are more balanced in that three samples are taken for each measure. There are 720 ways to acquire the six samples using a uniform sampling time. Of these, only a few measure CR and SR at the same average time and of these few, there are only two sequences that have equal times and have minimum distortion due to a nonlinear input phase R. The two sequences are listed below.

| Sequence 5: | S9 | S7 | S3 | S1 | S0 | S5 |
| --- | --- | --- | --- | --- | --- | --- |
| Sequence 6: | S1 | S0 | S5 | S9 | S7 | S3 |

Again, the time order of these sequences may be reversed with no effect on the result. The table below shows the time weighting of the samples for sequence 5.

| Sample time | sample | CR weight | Contribution to tc | SR weight | Contribution to ts |
| --- | --- | --- | --- | --- | --- |
| 0 | S9 | 1 | 0*1=0 | 0 | 0*0=0 |
| 1 | S7 | 0 | 1*0=0 | 2 | 1*2=2 |
| 2 | S3 | 1 | 2*1=2 | 0 | 2*0=0 |
| 3 | S1 | 0 | 3*0=0 | 1 | 3*1=3 |
| 4 | S0 | 2 | 4*2=8 | 0 | 4*0=0 |
| 5 | S5 | 0 | 5*0=0 | 1 | 5*1=5 |
| total | | | 10 | | 10 |

Sequence 6 just swaps samples S9, S7 and S3 with samples S1, S0 and S5 and will give the same result. The sequences interleave the samples that are used to measure CR and SR and so minimize the distortion due to nonlinear changes in the input phase R during the sampling interval. The six sample sequences 5 and 6 are preferred over the five sample sequences 1 and 2 when more samples can be taken during the sampling interval.

Given that the fiber optic component field is making progress, and methods of phase modulation are improving to the point that this type of discreet modulation is now possible using high speed integrated optic devices for phase modulators, the discreet modulation approach is now possible. Unlike sinusoidal modulation, the discreet modulation approach does not need to apply the phase modulation levels in any particular order in time. However, the aforementioned preferred modulation order for the 5 and 6 sample sequences results in improved dynamic measurement performance. This discreet modulation approach is a preferred and economical way to interrogate an array of sensors with a single demodulator, using the physical spacing between the sensors to produce a time division multiplexing of the return signals. It is also the preferred and economical way to interrogate a singular sensor when the sensor's operational bandwidth is high (20 KHz. or higher).

Thus, there has been shown novel demodulation apparatus and demodulation method which fulfill all of the objects and advantages sought therefor. Many changes, alterations, modifications and other uses and applications of the subject invention will become apparent to those skilled in the art after considering the specification together with the accompanying drawings. All such changes, alterations and modifications which do not depart from the spirit and scope of the invention are deemed to be covered by the invention which is limited only by the claims that follow.

What is claimed is:

1. An apparatus for determining the phase of phase shifted interference signals between sensor signals phase modulated in discrete steps and a feedback signal including:

means for sampling successive cycles of the phase shifting interference signals;

an even modulation component amplitude generator operatively connected to receive some of the samples of the phase shifting interference signals and to produce therefrom even modulation amplitude signals;

an odd modulation component amplitude generator operatively connected to receive some of the samples of the phase shifting interference signals and to produce therefrom odd modulation amplitude signals;

an octant generator operatively connected to receive the magnitudes of the even and odd modulation amplitude signals and from the magnitudes of the even and odd modulation amplitude signals and the difference between the magnitudes of the even and odd modulation amplitude signals produce octant signals which represent the octant of a phase vector having the even modulation amplitude signal as a first orthogonal ordinate and the odd modulation amplitude signal as a second orthogonal ordinate;

means to produce the feedback signal from the octant signals and the successive cycles of the phase shifting interference signals, for feeding back to an interferometer producing the phase shifting interference signals to stabilize the modulation depth of the interferometer; and an inverse tangent generator connected to the octant signals and the magnitudes of the even and odd modulation amplitude signals to produce therefrom output phase signals representing the phase of the sensor signal.

2. The apparatus as defined in claim 1 further including:

a fringe generator connected to said inverse tangent generator to compare successive output phase signals thereof for fringe crossings and to produce cumulative phase signals, each of which are the latest output phase signal to which said fringe generator adds or subtracts $2\pi$ radians to the previous cumulative phase signal depending on the direction of fringe crossing.

3. The apparatus as defined in claim 1 wherein the speed change in phase between successive cycles of the output phase signals is limited to less than $\pi$ radians, said apparatus further including:

a fringe generator connected to said inverse tangent generator to compare output signals thereof for at least $\pi$ radians difference, which indicate a phase fringe crossing, and to produce cumulative phase signals by adding $2\pi$ radians to the phase of the sensor signal when the output signal decreases by at least $\pi$ radians and by subtracting $2\pi$ radians from the phase of the sensor signal when the output signal increases by at least $\pi$ radians.

4. The apparatus as defined in claim 1 wherein said means to produce the feedback signal produce a fixed frequency signal that when fed back to the interferometer stabilizes the modulation depth within the interferometer about $\pi$ radians.

5. The apparatus as defined in claim 1 further including:

an interferometer to which the sensor signal and the feedback signal are fed, said interferometer producing the phase shifting interference signals therefrom.

6. The apparatus as defined in claim 5 wherein said means to produce the feedback signal produce a fixed frequency signal that when fed back to said interferometer stabilizes the modulation depth within said interferometer about $\pi$ radians.

7. The apparatus as defined in claim 5 wherein the phase shifting interference signals have a fixed modulation cycle with at least five out of twelve equal steps per cycle and said means for sampling successive cycles of the phase shifting interference signals sample at least five samples per modulation cycle.

8. The apparatus as defined in claim 7 wherein steps the twelve equal steps are at 0 radians, $\pm\pi/2$ radians, $\pm\pi$ radians, and $\pm 0.866\pi$ radians, with the $\pm 0.866\pi$ radians steps not being used.

9. The apparatus as defined in claim 8 wherein at least one step at 0 radians, at least one step at $\pm\pi/2$ radians, at least one step at $-\pi/2$ radians, a step at $+\pi$ radians, and a step at $-\pi$ radians are used.

10. The apparatus as defined in claim 9 wherein the arrangements in time of said steps in radians are either:

$-\pi$, $-\pi/2$, 0, $+\pi/2$, $+\pi$;

$-\pi$, $+\pi/2$, 0, $-\pi/2$, $+\pi$;

$+\pi$, $+\pi/2$, 0, $-\pi/2$, $-\pi$;

$+\pi$, $-\pi/2$, 0, $+\pi/2$, $-\pi$;

$-\pi/2$, $-\pi$, 0, $+\pi$, $+\pi/2$;

$-\pi/2$, $+\pi$, 0, $-\pi$, $+\pi/2$;

$+\pi/2$, $-\pi$, 0, $+\pi$, $-\pi/2$;or $+\pi/2$, $+\pi$, 0, $-\pi$, $-\pi/2$.

11. The apparatus as defined in claim 9 wherein the arrangements in time of said steps in radians to minimize distortion are either:

$-\pi$, $-\pi/2$, $+\pi$, $+\pi/2$, 0, $+\pi/2$;

$+\pi/2$, 0, $+\pi/2$, $+\pi$, $-\pi/2$, $-\pi$;

$+\pi/2$, 0, $+\pi/2$, $-\pi$; $-\pi/2$, $+\pi$; or $+\pi$, $-\pi/2$, $-\pi$; $+\pi/2$, 0, $+\pi/2$.

12. The apparatus as defined in claim 5 wherein the phase shifting interference signals have a fixed modulation cycle with at least five steps out of twelve modulation steps, M0 through M11, at 0 radians, $\pm\pi/2$ radians, $\pm 0.866\pi$ radians, and $\pm\pi$ radians, per cycle and said means for sampling successive cycles of the phase shifting interference signals sample at least five of S0 through S11 samples per modulation cycle with S0 being the result of the 0 radians M0 modulation step, S1 being the result of the M1 modulation step and so on, said means to produce the feedback signal from the octant signals and the phase shifting interference signals produces a fixed frequency signal whose phase is varied in steps and includes:

a sine generator that produces a sine output signal;

a modulation error generator which for O0 through O7 octants combines $-2S0+2S1-S3+2S7-S9$ for O0, combines $-S3+S9$ for O1, combines $-S3+S9$ for O2, combines $2S0-2S1+S3-2S7+S9$ for O3, combines $2S0-2S1+S3-2S7+S9$ for O4, combines $S3-S9$ for O5, combines $S3-S9$ for O6, and combines $-2S0+2S1-S3+2S7-S9$ for O7, to produce modulation error signals;

a first adder to combine each new modulation error signal with any previous modulation error signals to produce combined modulation error signals;

a first multiplier to multiply the combined modulation error signals with the sine output signal to produce the fixed frequency sinusoidal signal; and a step generator to produce the at least five steps from the fixed frequency sinusoidal signal.

13. The apparatus as defined in claim 12 further including:

a modulation feedback gain generator for producing an adjustable gain signal;

a second multiplier to multiply each new modulation error signal by the adjustable gain signal before it is combined with the previous combined modulation error signal.

14. A demodulator apparatus for an interferometer to measure the phase of analog outputs of the interferometer including:

an analog to digital converter, which samples the analog outputs of the interferometer;

a digital signal processor; and a clock producing:
 a first clock signal; and
 a second clock signal at least every twelve first clock signals, the first clock signal being connected to said analog to digital converter to cause at least five samples of the analog output to be taken by said analog to digital converter and operatively connected to the interferometer to control the length of one modulation period, and the second clock signal being connected to said digital signal processor to control passage of the at least five samples to said digital signal processor from said analog to digital converter to signal that one modulation period has passed, said digital signal processor including:
  means to extract from the at least five samples the cosine and sine of the input phase of the analog outputs of the interferometer, and the amplitude modulation by summing and differencing said at least five samples in at least two sample pairs one half modulation cycle apart to isolate properties of the interferometer analog outputs within the octant of the input phase; and
  an inverse tangent generator connected to the cosine and sine of the input phase of the analog outputs of the interferometer to compute a phase number indicating the input phase within the octant of operation and to add thereto the phase in the octant of operation.

15. The demodulator apparatus for an interferometer to measure the phase of analog outputs of the interferometer as defined in claim 14 wherein the input phase changes by less than $\pi$ radians during the time of a modulation cycle, said apparatus further including:

means to track fringe crossings and create a cumulative phase number representative of the cumulative change in phase from the start of operation of said demodulator including:
 means to add $2\pi$ radians to the cumulative phase number minus the phase number when the phase number decreases by at least $\pi$ radians; and
 means to subtract $2\pi$ radians from the cumulative phase number plus the phase number when the phase number increases by at least $\pi$ radians.

16. An open loop method for measuring the phase shift in each modulation cycle of a time varying signal between a sensor signal that is phase modulated by an external effect and a fixed frequency signal stepped in phase by a phase step generator whose amplitude is controlled, the sensor signal and the fixed frequency signal being combined to interfere with each other forming the time varying signal so that the external effect can be determined, including:

digitizing each modulation cycle of the time varying signal;

sampling at least five stepped portions of each modulation cycle of the digitized time varying signal to produce sample portions thereof;

combining selected sample portions of each modulation cycle into an even modulation signal for each modulation cycle;

determining the magnitude of the even modulation signal for each modulation cycle;

combining selected sample portions of each modulation cycle into an odd modulation signal for each modulation cycle;

determining the magnitude of the odd modulation signal for each modulation cycle;

producing an octant signal representative of the octant of the phase shift from the even modulation signal, the odd modulation signal and the difference there between; and determining the inverse tangent of the combination of the magnitude of the odd modulation signal and the magnitude of the odd modulation signal in the octant as determined by the octant signal to determine the phase shift in each modulation cycle of the time varying signal and hence the phase variations in the sensor signal.

17. The open loop method as defined in claim 16 wherein said sampling of at least five stepped portions of each modulation cycle of the digitized time varying signal includes:

sampling at least twelve portions.

18. The open loop method as defined in claim 16 wherein said sampling of said at least five stepped portions of each modulation cycle of the digitized time varying signal includes:

sampling twelve portions, said combining selected sample portions of each modulation cycle into an even modulation signal for each modulation cycle including:
 adding samples one and seven, and subtracting therefrom samples four and ten, and said combining selected sample portions of each modulation cycle into an odd modulation signal for each modulation cycle includes:
  adding samples eight and twelve, and subtracting therefrom samples two and six.

19. The open loop method as defined in claim 16 further including:

sampling twelve portions;

controlling the amplitude and phase of the fixed frequency signal by:
 producing modulation error signals from the twelve sample portions by:
  adding samples two, six, eight, and twelve and subtracting samples one, four, seven, and ten therefrom when the phase of the time varying signal is in the first octant;
  subtracting sample four from sample ten when the phase of the time varying signal is in the second octant;
  subtracting sample four from ten sample when the phase of the time varying signal is in the third octant;
  adding samples one, four, seven, and ten and subtracting samples two, six, eight, and twelve therefrom when the phase of the time varying signal is in the fourth octant;
  adding samples one, four, seven, and ten and subtracting samples two, six, eight, and twelve therefrom when the phase of the time varying signal is in the fifth octant;

subtracting sample ten from sample four when the phase is in the sixth octant;

subtracting sample ten from sample four when the phase of the time varying signal is in the seventh octant; and adding samples two, six, eight, and twelve and subtracting samples one, four, seven, and ten therefrom when the phase of the time varying signal is in the eighth octant.

20. The open loop method as defined in claim 19 further including:

adding each new modulation error signal with any previous modulation error signals to produce combined modulation error signals; and multiplying each combined modulation error signal with the stepped output signal from the phase step generator to produce the fixed frequency signal that is stepped in phase.

21. The open loop method as defined in claim 20 further including:

producing an adjustable gain signal;

multiplying each new modulation error signal by the adjustable gain signal before it is combined with the previous combined modulation error signal.

22. The open loop method as defined in claim 21 further including:

converting the fixed frequency signal into analog form; and applying an adjusting gain to the converted fixed frequency signal to maintain the magnitude of the analog fixed frequency signal.

23. A method to provide a feedback loop to stabilize the modulation depth of a time varying signal output of an interferometer subject to changes in modulation depth which otherwise destabilize its output with respect to an input signal to the interferometer whose phase is to be determined including:

producing a digital signal stepped in phase in at least five steps of 0, $\pm\pi/2$, and $\pm\pi$ radians;

producing an analog signal stepped in phase in at least five steps of 0, $\pm\pi/2$, and $\pm\pi$ radians from the digital signal stepped in phase;

digitizing each modulation cycle of the time varying signal;

sampling at least five portions of each modulation cycle of the digitized time varying signal;

combining selected sample portions of each modulation cycle into an even modulation signal for each modulation cycle;

determining the magnitude of the even modulation signal for each modulation cycle;

combining selected sample portions of each modulation cycle into an odd modulation signal for each modulation cycle;

determining the magnitude of the odd modulation signal for each modulation cycle;

producing an octant signal representative of the octant of the phase shift from the even modulation signal, the odd modulation signal and the difference there between; and controlling the amplitude of the analog signal stepped in phase by:

producing modulation error signals from the at least five sample portions by:

adding two samples produced by steps at $+\pi/2$ radians and two samples produced by steps at $-\pi/2$ radians and subtracting two samples produced by steps at 0 radians and samples produced by steps at $+\pi/2$ and $-\pi/2$ radians therefrom when the phase of said time varying signal is in the first octant;

subtracting a sample produced by a step at $+\pi$ radians from a sample produced by a step at $-\pi$ radians when the phase is in the second octant;

subtracting a sample produced by a step at $+\pi$ radians from a sample produced by a step at $-\pi$ radians when the phase is in the third octant;

adding two samples produced by steps at 0 radians and samples produced by steps at $+\pi/2$ and $-\pi/2$ radians and subtracting two samples produced by steps at $+\pi/2$ radians and two samples produced by steps at $-\pi/2$ radians therefrom when the phase is in the fourth octant;

adding two samples produced by steps at 0 radians and samples produced by steps at $+\pi/2$ and $-\pi/2$ radians and subtracting two samples produced by steps at $+\pi/2$ radians and two samples produced by steps at $-\pi/2$ radians therefrom when the phase is in the fifth octant;

subtracting a sample produced by a step at $-\pi$ radians from a sample produced by a step at $+\pi$ radians when the phase is in the sixth octant;

subtracting a sample produced by a step at $-\pi$ radians from a sample produced by a step at $+\pi$ radians when the phase is in the seventh octant; and adding two samples produced by steps at $+\pi/2$ radians and two samples produced by steps at $-\pi/2$ radians and subtracting two samples produced by steps at 0 radians and samples produced by steps at $+\pi/2$ and $-\pi/2$ radians therefrom when the phase is in the eighth octant.

24. The method as defined in claim 23 further including:

adding each new modulation error signal with any previous modulation error signals to produce combined modulation error signals; and multiplying each combined modulation error signal with the digital signal stepped in phase to produce a corrected digital signal stepped in phase; and passing the corrected digital signal stepped in phase through a digital to analog converter thereby producing the analog signal stepped in phase in at least five steps of 0, $\pm\pi/2$, and $\pm\pi$ radians from the digital signal stepped in phase.

25. The method as defined in claim 24 further including:

producing an adjustable gain signal;

multiplying each new modulation error signal by the adjustable gain signal before it is combined with the previous combined modulation error signal.

* * * * *